(12) United States Patent
Vasiloiu

(10) Patent No.: US 6,611,138 B2
(45) Date of Patent: Aug. 26, 2003

(54) INDUCTIVE MEASURING DEVICE FOR DETECTING RELATIVE POSITION AND/OR MOVEMENT

(75) Inventor: Victor Vasiloiu, Braunau (AT)

(73) Assignees: Rexroth Star GmbH, Schweinfurt (DE); AMO Automatisierung Messtechnik Optik GmbH, Braunau (AT)

(*) Notice: Subject to any disclaimer, the term of this patent is extended or adjusted under 35 U.S.C. 154(b) by 0 days.

(21) Appl. No.: 09/883,523

(22) Filed: Jun. 18, 2001

(65) Prior Publication Data

US 2002/0017902 A1 Feb. 14, 2002

(30) Foreign Application Priority Data

Jun. 16, 2000 (EP) .............................. 00890192

(51) Int. Cl.⁷ ............................ G01B 7/02; G01B 7/14; G01B 7/30; G01B 5/22
(52) U.S. Cl. ........................... 324/207.12; 324/207.17; 324/207.18; 324/207.25; 336/45
(58) Field of Search .......... 324/207.12, 207.16–207.19, 324/207.24, 207.25, 239; 318/656, 660, 661; 336/45, 130, 131, 75–79; 340/870.32, 870.33, 870.35, 870.36

(56) References Cited

U.S. PATENT DOCUMENTS

| | | | |
|---|---|---|---|
| 4,005,396 A | * 1/1977 | Fujiwara et al. | 324/207.17 X |
| 4,737,698 A | 4/1988 | McMullin et al. | 318/653 |
| 5,389,876 A | * 2/1995 | Hedengren et al. | 324/242 |
| 5,434,504 A | 7/1995 | Hollis et al. | 324/207.17 |
| 5,659,248 A | * 8/1997 | Hedengren et al. | 324/242 |
| 5,841,274 A | 11/1998 | Masreliez et al. | 324/207.17 |
| 5,886,519 A | 3/1999 | Masreliez et al. | 324/207.17 |
| 5,894,678 A | 4/1999 | Masreliez et al. | 33/762 |
| 5,901,458 A | 5/1999 | Andermo et al. | 33/810 |
| 5,936,399 A | 8/1999 | Andermo et al. | 324/207.17 |
| 5,973,494 A | 10/1999 | Masreliez et al. | 324/207.24 |

(List continued on next page.)

FOREIGN PATENT DOCUMENTS

| | | |
|---|---|---|
| DE | 19621886 | 12/1997 |
| DE | 19803249 | 8/1998 |
| DE | 19813497 | 9/1999 |
| EP | 0557608 | 9/1993 |
| EP | 0596535 | 5/1994 |
| EP | 0743508 | 11/1996 |
| EP | 0805339 | 11/1997 |
| GB | 1554388 | 10/1979 |

OTHER PUBLICATIONS

English–language Abstract of EP0 557 608.
English–language Abstract of DE 198 13 497.
DIALOG English–language Abstract for EP 0 596 535.

*Primary Examiner*—Gerard R. Strecker
(74) *Attorney, Agent, or Firm*—Baker Botts L.L.P.

(57) ABSTRACT

An inductive length measuring system which, by scanning a scale with a graduation of periodically variable reluctance and a coil system in a linear arrangement, can detect information relating to the position and/or the movement of the coil system with reference to the scale. The coil structure comprises a multi-ply arrangement of a combination of coils in the form of planar spiral windings or turns having a plurality of receiver pairs, each pair having two differentially connected receiver elements which can be interconnected for the purpose of signal generation for each of at least two measuring channels, and wherein at least one emitter element is provided which is inductively coupled to the receiver elements as a function of the relative position in the measuring direction relative to the measuring scale, thereby generating at least one output signal which is compensated for offset and/or sinusoidal shape and/or amplitude.

18 Claims, 23 Drawing Sheets

U.S. PATENT DOCUMENTS

| | | | |
|---|---|---|---|
| 5,998,990 A | 12/1999 | Andermo et al. | 324/207.12 |
| 6,002,250 A | 12/1999 | Masreliez et al. | 324/207.16 |
| 6,005,387 A | 12/1999 | Andermo et al. | 324/207.17 |
| 6,011,389 A | 1/2000 | Masreliez et al. | 324/207.17 |
| 6,043,644 A | 3/2000 | de Coulon et al. | 324/207.18 |
| 6,049,204 A | 4/2000 | Andermo et al. | 324/207.17 |
| 6,054,851 A | 4/2000 | Masreliez et al. | 324/207.17 |
| 6,157,188 A | 12/2000 | Steinke | 324/207.17 |
| 6,259,249 B1 | 7/2001 | Miyata | 324/207.17 |

\* cited by examiner $|\bar{B}s+| = |\bar{B}s-|$    $|\bar{B}c+| \neq |\bar{B}c-|$

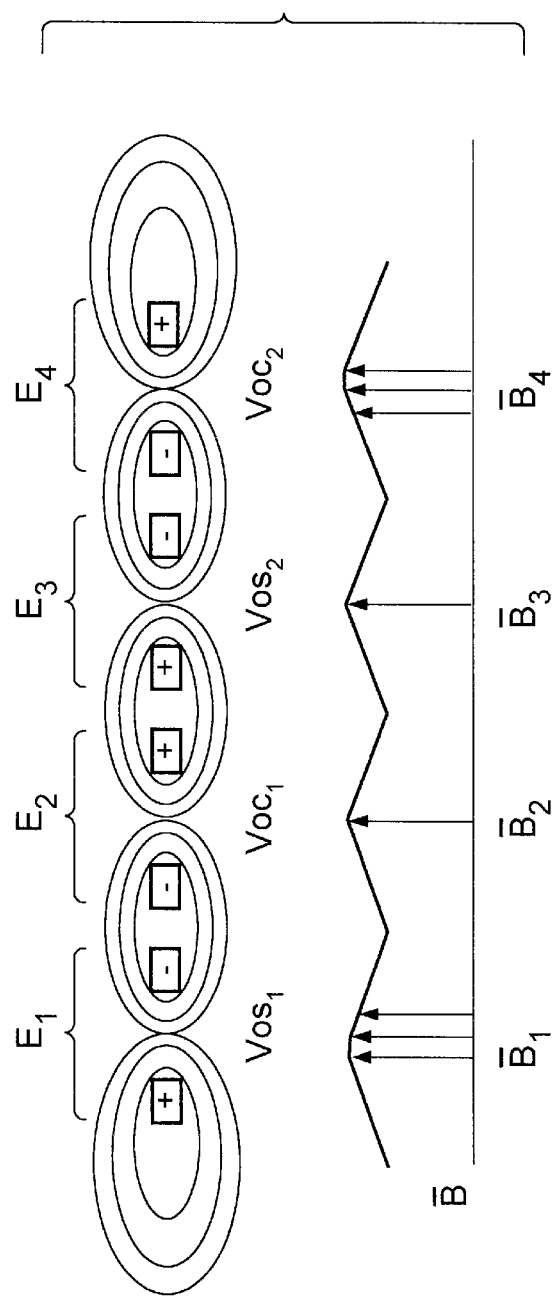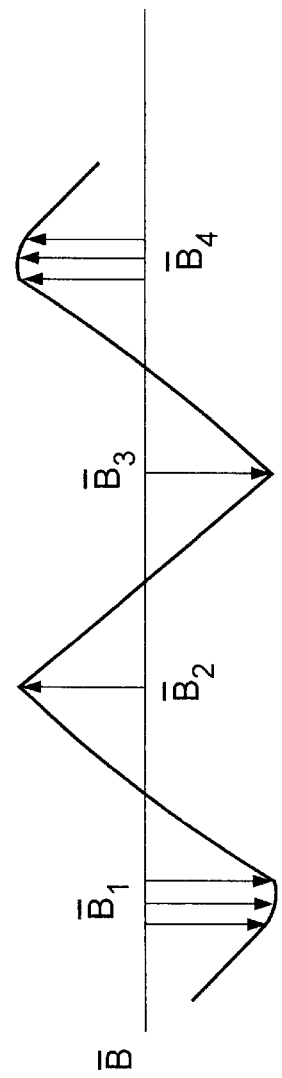
FIG. 10a
FIG. 10b

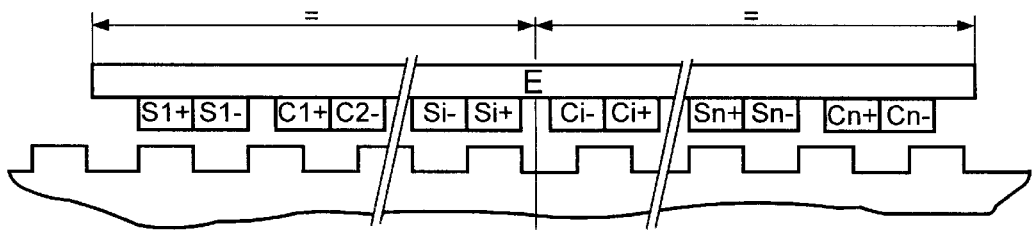
F I G. 11
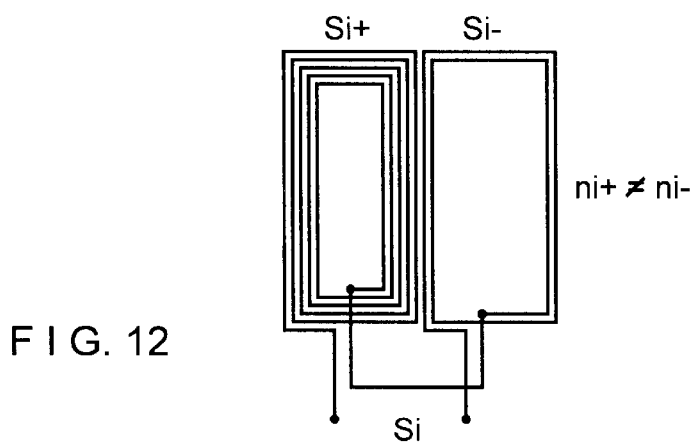
F I G. 12
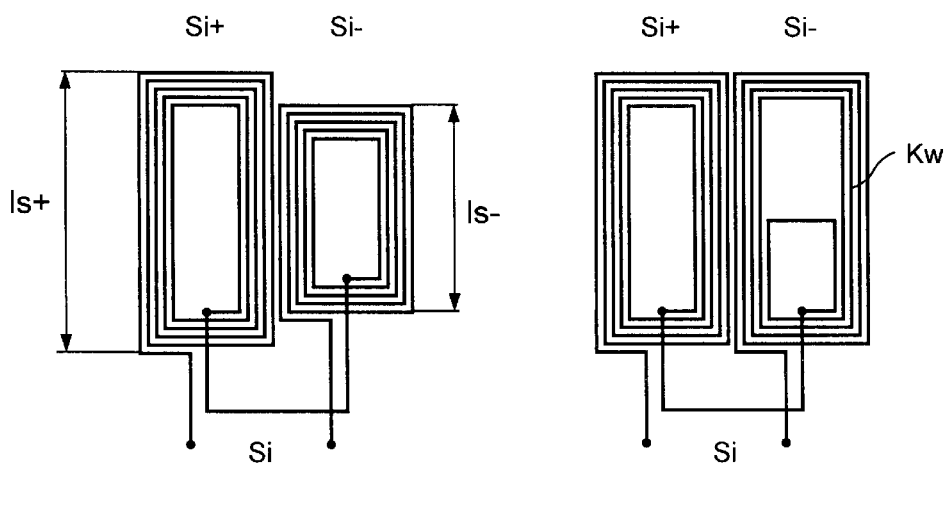
F I G. 13a  F I G. 13b

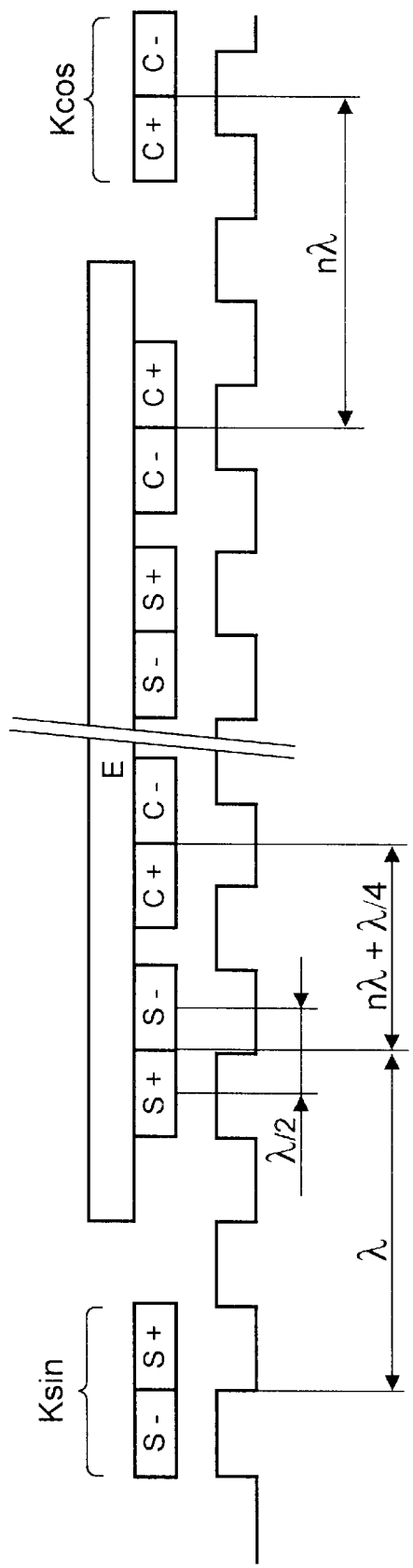
F I G. 14a
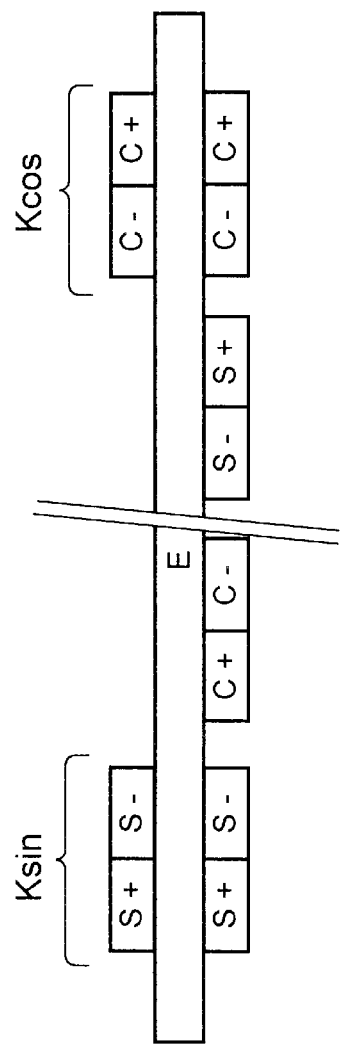
F I G. 14b

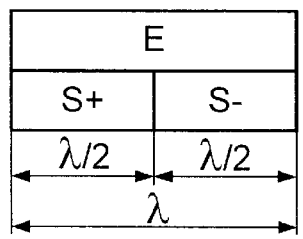
F I G. 20a
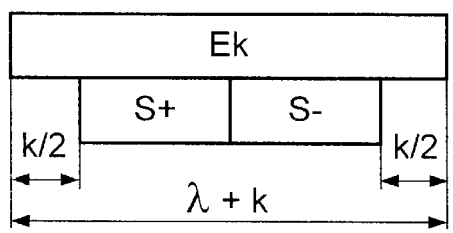
F I G. 20b
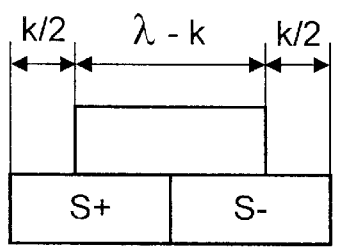
F I G. 20c
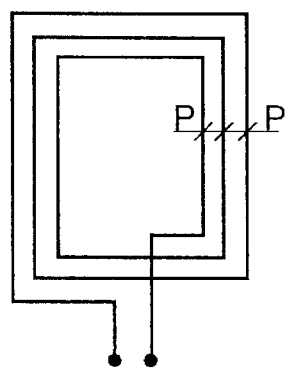
F I G. 21a
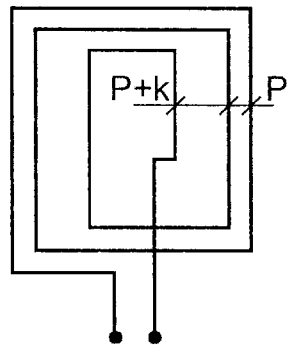
F I G. 21b

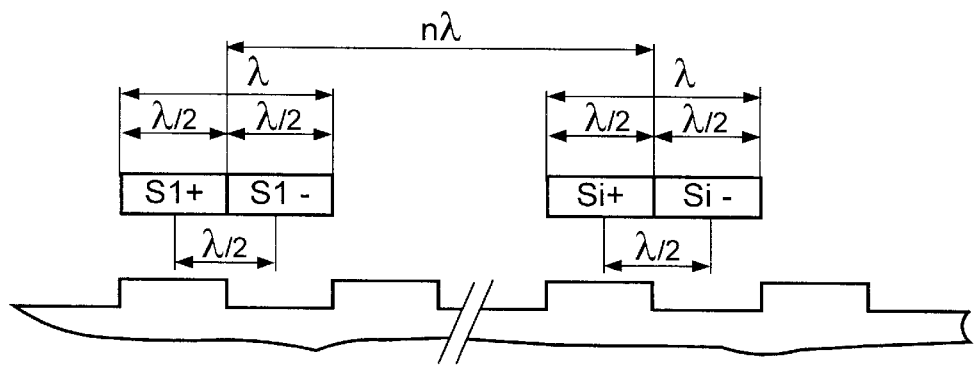
F I G. 22a
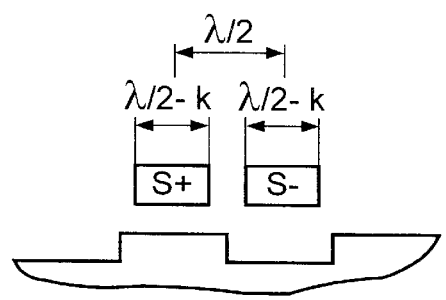
F I G. 22b
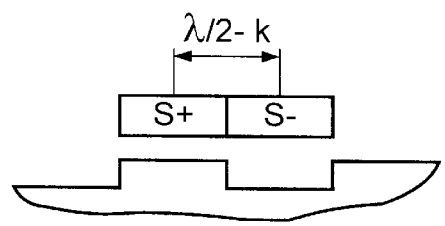
F I G. 22c
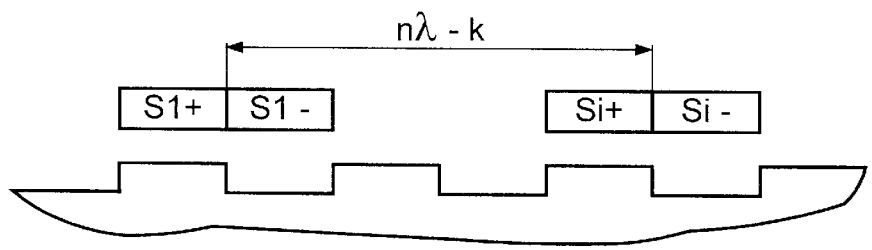
F I G. 22d

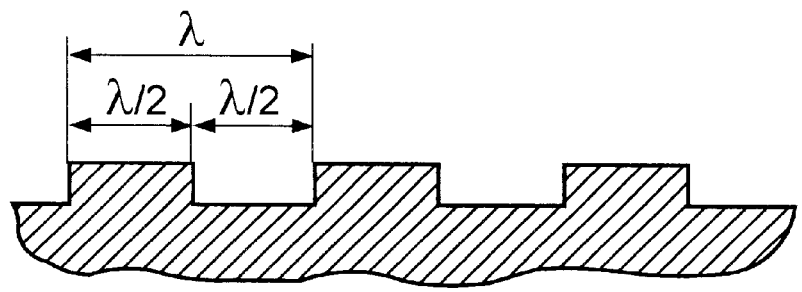
F I G. 23a
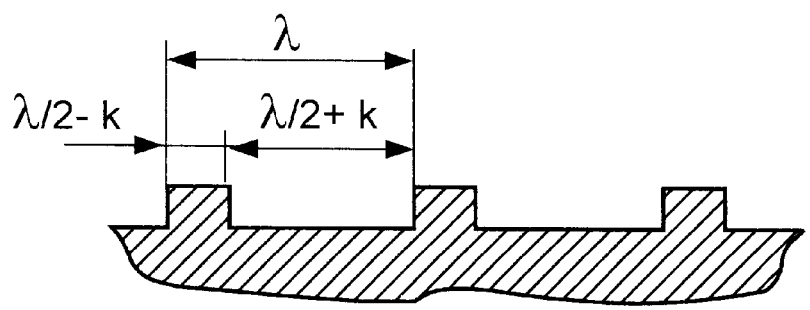
F I G. 23b
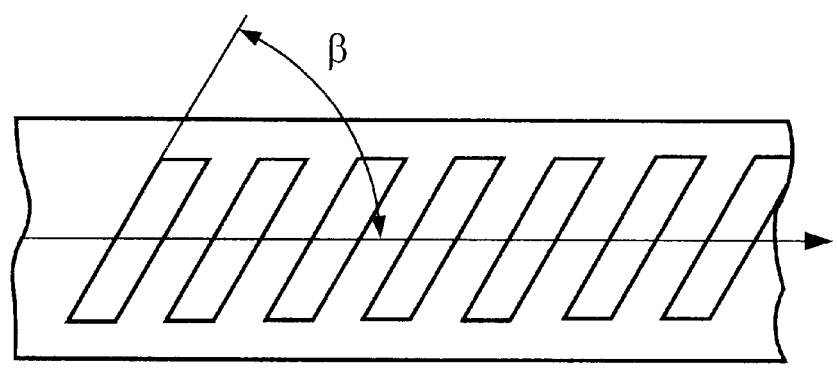
F I G. 23c

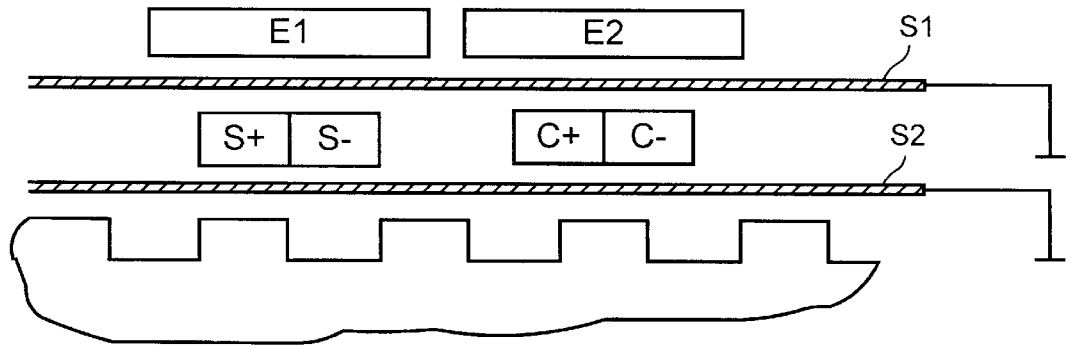
F I G. 27
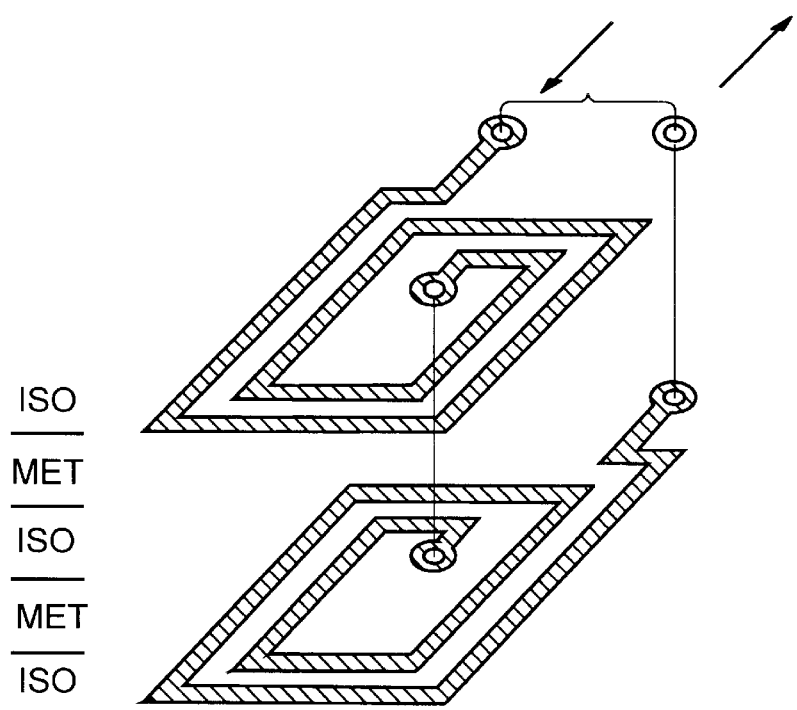
F I G. 28

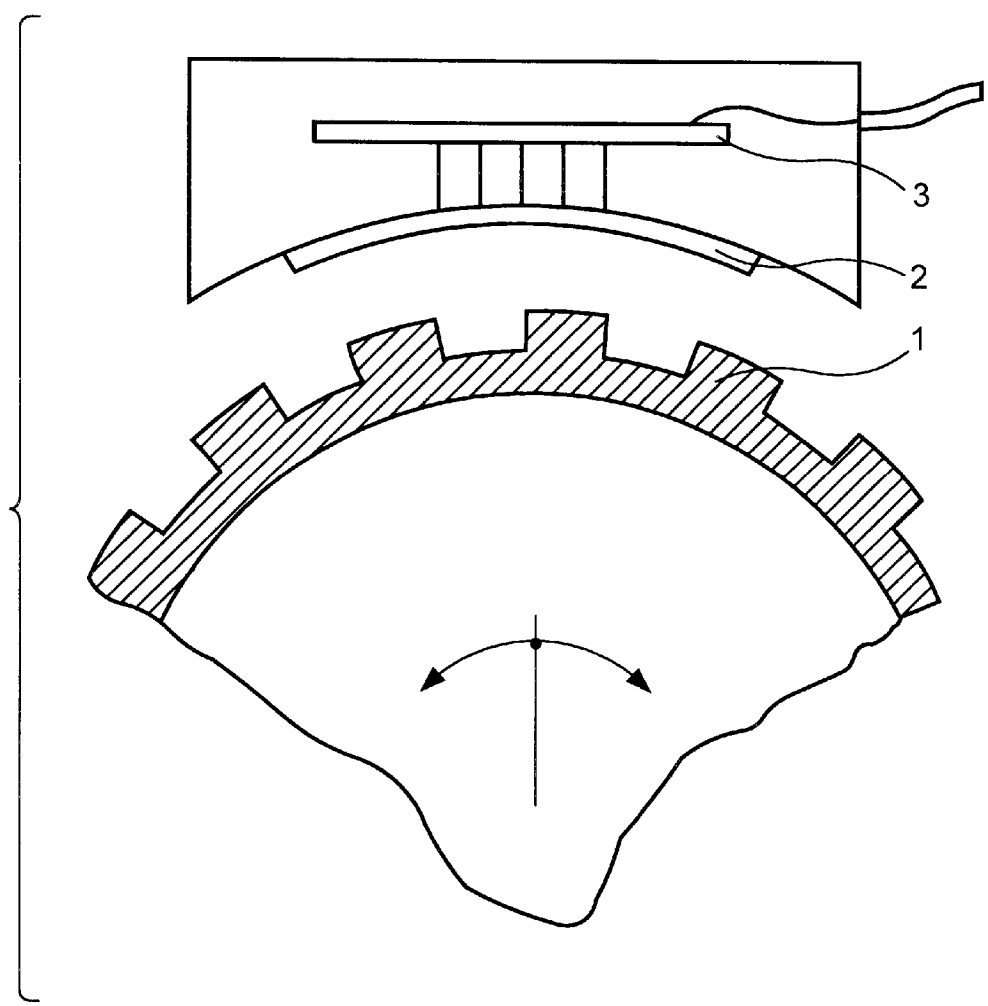
F I G. 30

INDUCTIVE MEASURING DEVICE FOR DETECTING RELATIVE POSITION AND/OR MOVEMENT

BACKGROUND OF INVENTION

1. Field of the Invention

The invention relates to an inductive length measuring system which, by scanning a scale with a graduation of periodically variable reluctance and a coil system in a linear arrangement, can detect information relating to the position and/or the movement of the coil system with reference to the scale.

2. The Prior Art

Such a length measuring system is disclosed in DE 19803249 A1.

A general comparison of known measuring systems yields the following result:

Main features of optoelectronic measuring systems: High accuracy for fine graduation periods, extremely sensitive to contamination, low shock-vibration loading.

Main features of magnetic measuring systems: Mean accuracy through graduation accuracy and interpolation error within the graduation period (harmonic content and signal deviations from one period to the other); polarized scale attracts magnetic particles and can be erased or damaged by external magnet noise fields.

Main features of inductive measuring systems: Many designs are known, generally a very robust design, extremely slight influence by temperature, based on the transformer principle, the transmission between primary and secondary coils being influenced by an element which moves relative to the coils.

Some design examples for inductive measuring systems:

The transducer of INDUCTOSYN (trademark) type comprises two elements, a scale and carriage, both of which have active planar windings, meandering on the primary and secondary sides, in the measuring surface. The device has a high accuracy, but requires a large coupling surface between the two elements because of its scanning principle. It functions in low carrier frequency ranges, and this limits the traversing speed and is very complicated in terms of design.

Inductive probes are cylindrical differential transformers comprising a primary coil, coupled to two concentrically wound secondary coils connected in opposition, and a core with a marking of different reluctance. The device transforms the relative position of the plunger core coils into an approximately linear output signal for a defined measuring range. High accuracies can be achieved for small measuring strokes, but the device is not suitable for larger measuring strokes and dynamic applications.

EP 0557608 B1 describes a spiral coil structure which is built in a multilayer metal insulating coating onto a soft magnetic or hard magnetic substrate using thick film technology. A measuring device functions according to the principle only in frequency ranges which do not bring the coil substrate into nonlinear magnetic regions, and is not suitable for high accuracies, owing to the detection of phase shift in the downstream resonant circuits.

The applied measuring principle for a type of "inductive potentiometer" is described by the same applicant in DE 19813497 A1. In that case, the relatively coarse accuracy which can be achieved is strongly influenced by tiltings of the core with respect to the coil plane.

EP 0805339 A1 describes a measuring device which functions according to a similar functional principle as described in the previous example. The device uses a planar multi-ply transformer coil arrangement for scanning a toothed measuring wheel. This arrangement comprises a primary coil in a plane, and two secondary coils offset from one another in the measuring direction. The individual secondary coils form either two measuring channels, which permit the direction to be detected by the local phase offset of the amplitude-modulated signals, or one measuring channel, the coils being connected differentially. In the first design variant (which exhibits a non-differential arrangement), the signals generated, with a weak degree of modulation, are strongly influenced by parasitic effects such as temperature, geometrical tilting of the coils with respect to the measuring wheel etc., and in the second design the detection of the direction of movement is possible only for high speeds (for slow point-to-point positioning the phase shift induced by speed tends to zero). This printed publication does not consider possible inductive interactions of a plurality of coils in one and the same structure. As also shown in the examples of the singly digitizing electronic evaluation system, the device described is suitable only for coarse detection of movement.

Inductive, absolutely operating position transducers are described in DE 19803249 A1 (Mitutoyo company). This device is designed chiefly for calliper rules. A plurality of measuring tracks arranged parallel to one another are scanned for the purpose of absolute position detection. The measuring device comprises a metal-structured scale, embedded in the body of a calliper rule, and a coil arrangement operating differentially in principle is accommodated in the carriage, which is guided accurately in relation thereto. A periodic metal graduation of a coil subsystem is scanned only with regard to the incremental track (finest measuring track). This planar system chiefly comprises a field coil and two receiver coil channels, which are inductively coupled to the field coil and can detect the position via the measuring graduation in the case of a relative movement. The two receiver coil channels are arranged in a phase-shifted fashion relative to one another (geometrically offset from one another) in order to detect the direction of movement.

The receiver coils, which comprise for each channel a plurality of differentially connected individual turns, are surrounded in the structural plane by the field coil turns. The magnetic field generated by the field coil does not have a uniform distribution over the entire inner coil region, but is substantially stronger in the vicinity of its turns and decreases in the direction of the middle of the coil. It is geometrically impossible because of this effect to place two differential, offset coils within an emitter framework in conjunction with the same field form and field strength. This means that, at least one of the two measuring channels, which are connected (in a simplified representation) as two differential receiver coils connected in opposition, are not arranged symmetrically relative to the emitter framework and are flowed through by different magnetic field strengths. In the case of a relative movement in the measuring direction with respect to the scale, the result after subtraction of the induced voltages is that the modulated useful signal does not oscillate about "zero", but fluctuates about a value which is proportional to the static field strength difference in the two receiver surfaces. It is virtually impossible for this value, denoted as signal offset, to be completely adjusted in a downstream electronic evaluation system, since its amplitude is partly influenced by secondary effects of movement such as the coil-scale separation or relative tiltings, and it is therefore not constant for an overall measuring operation.

The author of this patent specification recognizes the problem (page 10, paragraph 25), but the design proposal is not effective, since although placing the asymmetric receiver winding pairs further away from the emitter windings in the middle of the emitter coils does bring the latter into a region where the exciter field and its gradients are weaker, there is also a consequent reduction in the induced useful signal, and so the ratio of useful signal to signal offset remains unfavorable, as before.

SUMMARY OF THE INVENTION

It is the object of the invention to combine the advantages of the optoelectronic length measuring devices, which have high accuracies and high achievable resolutions in the range of $\leq 1$ $\mu$m, with the advantages of the inductive devices, which have a high degree of robustness and stability with respect to environmental influences.

The above-mentioned object is accomplished by an inductive measuring device for detecting position, comprising a coil structure and a measuring scale having at least one graduation of variable reluctance or conductivity, wherein the coil structure comprises a multi-ply arrangement of a combination of coils in the form of planar spiral windings or turns having a plurality of receiver pairs, each pair having two differentially connected receiver elements which can be interconnected for the purpose of signal generation for each of at least two measuring channels, and wherein at least one emitter element is provided which is inductively coupled to the receiver elements as a function of the relative position in the measuring direction relative to the measuring scale, whereby at least one output signal is generated which is compensated for offset and/or sinusoidal shape and/or amplitude.

Owing, in particular, to the high accuracy in the $\mu$m region and to the high achievable system dynamics, the measuring device described below is suitable for process controllers in which machine elements have to be accurately positioned.

In addition to the previous advantages, particular mention is to be made of the high degree of miniaturization and the favorable costs of production technology for scanning sensors and the measuring scale.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The present invention will be described in detail hereinafter with reference to the accompanying drawings on the basis of preferred embodiments. In the drawings:

FIG. 8b is a graphic representation of a possible placement of the sinusoidal elements S+, S– relative to the emitter geometry of the single-emitter basic structure of FIG. 8a;

FIGS. 10a–b show an extended multiemitter structure and field intensity distributions for the same direction of induction and for the opposite direction of induction;

FIG. 11 is a representation of a single-emitter structure with a plurality of receiver elements;

FIG. 12 is a representation of individual coil elements having a different number of turns;

FIG. 13a is a representation of a coil element with an adapted receiver coil surface;

FIG. 13b is a representation of another coil element with an adapted receiver coil surface;

FIGS. 14a–b are graphic representations for illustrating another compensation method of a single-emitter structure;

FIGS. 20a–c are illustrations of different emitter coil geometries;

FIGS. 21a–b are illustrations of different distributions of the individual windings in the emitter plane;

FIGS. 22a–d are examples of different receiver geometries and receiver positions in the measuring direction;

FIGS. 23a–c are examples of a measuring scale;

FIG. 27 is an example of placement of individual coil planes one above another, with large-area metallic thin film planes being provided between the active coil planes and/or outside thereof;

FIG. 28 is an illustration of an elementary coil;

FIG. 30 is an illustration of a rotational embodiment of the system according to the invention.

DETAILED DESCRIPTION

In accordance with the invention, the device fundamentally comprises three elements (FIG. 1), specially a measuring scale (1), an inactive scale with a periodic graduation in the longitudinal direction, a compensated coil structure (2), which contains inductive intercoupled emitter and receiver coils, and an electronic evaluation system (3) which is connected to this structure and supplies the emitter coils, on the one hand, and evaluates the measuring signals generated by the structure, on the other hand.

The measuring scale is permanently connected to a first machine part, and the coil structure is connected to a second one together with the electronic evaluation system (termed scanning unit).

In the event of the relative movement between the two machine parts in the longitudinal direction (X), the emitter field is modulated in the receiver plane by the alternately differing regions of the measuring graduation in the measuring scale, and is detected by the receiver coils and relayed to the electronic evaluation system as measurement information.

Figure 2A:
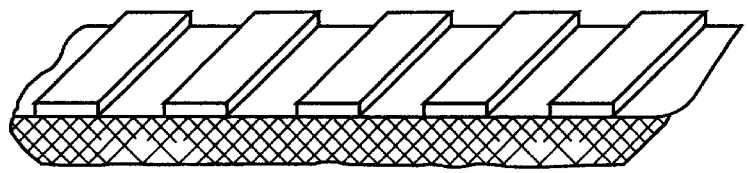
FIGS. 2a–f are representations of different measuring scales of the measuring device shown in FIG. 1.
Figure 2B:
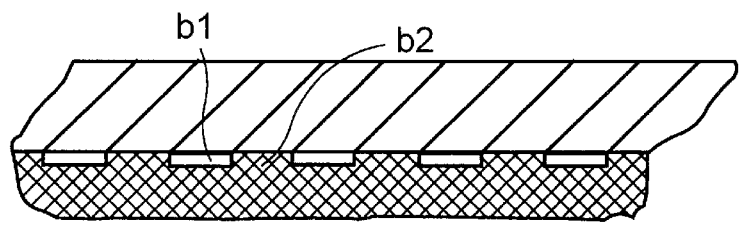

The measuring system can fundamentally be operated on the basis of two functional principles which differ from one another in terms of geometrical relationships, design details and exciter frequency. The first functional principle is based on scanning a scale with periodically alternating regions of different electric conductivity (FIGS. 2a and 2b). Owing to the dimensioning of the system, the eddy currents induced by the emitter coils in the more conductive regions of the scale and the electromagnetic fields generated thereby act against the emitter field such that the overall field is weakened in these regions in the plane of the receiver coil. This periodic, positionally dependent field structure is detected by the receiver coils and further processed by the downstream electronic system.

Figure 2C:
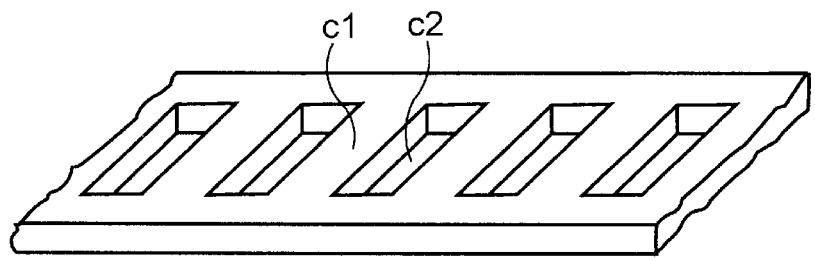
Figure 2D:
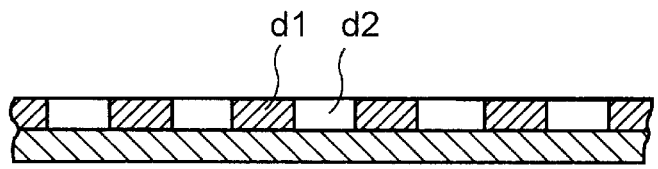
Figure 2E:
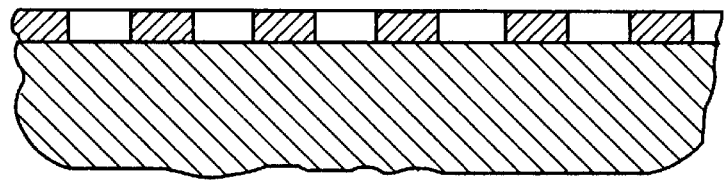

The second functional principle is based on the scanning of a scale made from soft magnetic material, where regions of different reluctance are resulting from a periodic structuring of the measuring scale (FIG. 2c). The regions with low reluctances (material bridges, teeth) act as concentrators for the field generated by the emitter coils, and this periodic field profile is detected by the receiver coils in the event of a relative movement of the measuring scale with respect to the scanning unit in the longitudinal direction.

Figure 2F:
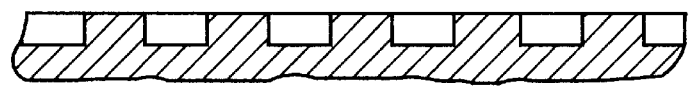

The measuring scale (FIG. 1 and FIG. 2) can be implemented by one of the following methods, depending on the functional principle and production options:

Thin-film or thick-film technology: structuring of the graduation in a metal layer on an insulating substrate (FIGS. 2a and 2b); structuring of a metal foil by etching or stamping (FIG. 2c); assembling a structured foil (FIG. 2c) on a metal carrier band (FIG. 2d); mounting a structured foil on a massive substrate or machine part (FIG. 2e); and producing a graduation directly in a solid substrate or metal foil by etching or mechanical working (FIG. 2f).

The sensor structure (FIG. 1 and FIG. 3) comprising a multi-ply (combination of metal and insulating layers with plated-through connections) spiral coil arrangement, which is applied to a substrate (34), is chiefly supplied by the emitter coil (31) with an AC voltage.

$$V_R = U_0 \sin \omega t \quad (1.1)$$

This exciter voltage need not necessarily be sinusoidal, but it is possible to design a rectangle, triangle or the like voltages depending on the design data, which does not influence the further considerations.

Figure 3:
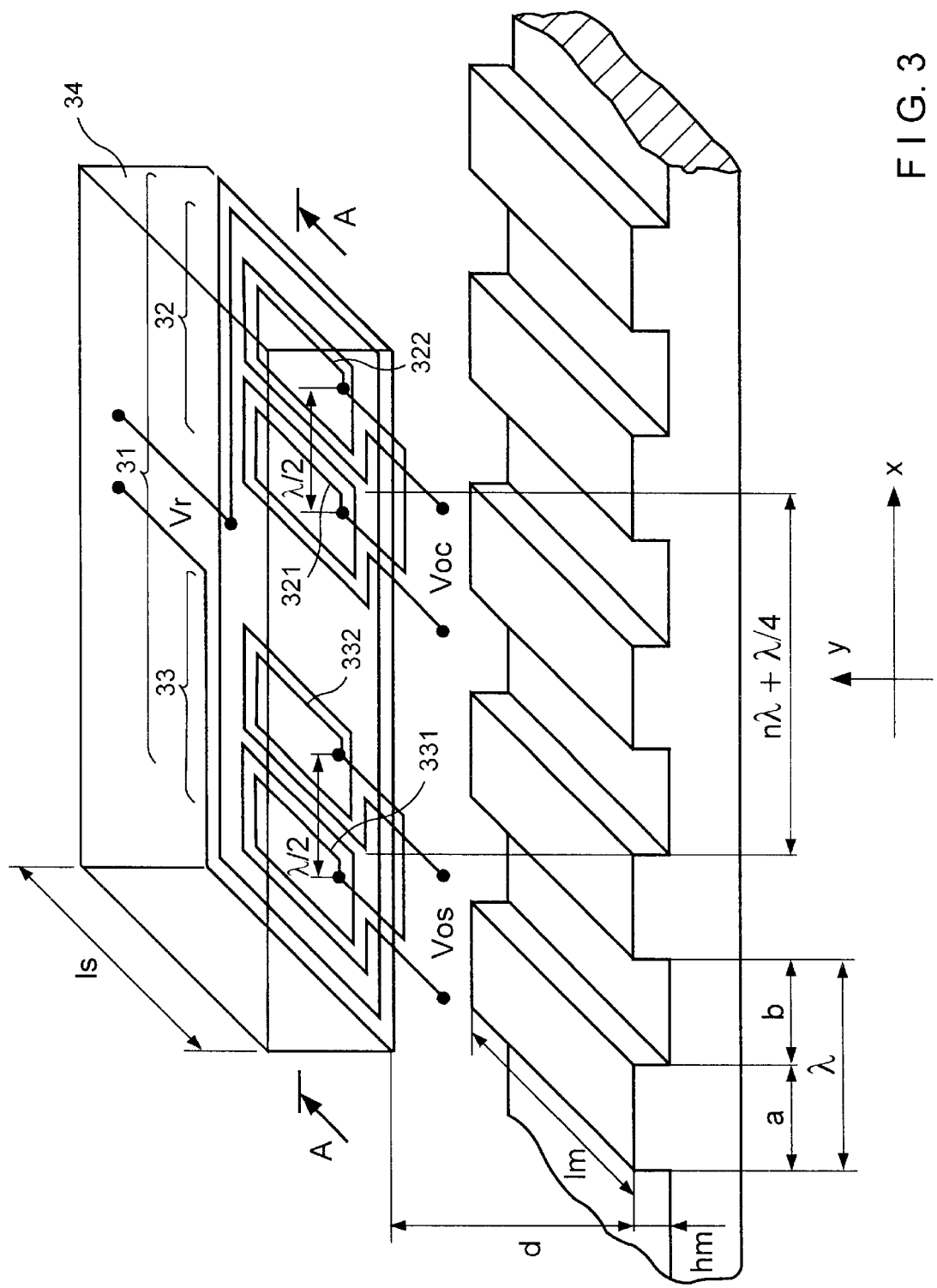
FIG. 3 is a simplified perspective representation of the receiver coil system.

The receiver coil system, illustrated in a simplified fashion in FIG. 3, has two geometrically phase-shifted ($\phi$) receiver coil pairs (32 and 33), each of the two receiver coil pairs comprising two differentially connected coil elements in phase opposition ($\lambda/2$) with the same shape and number of turns per unit length (331, 332 and 321, 322).

Figure 5:
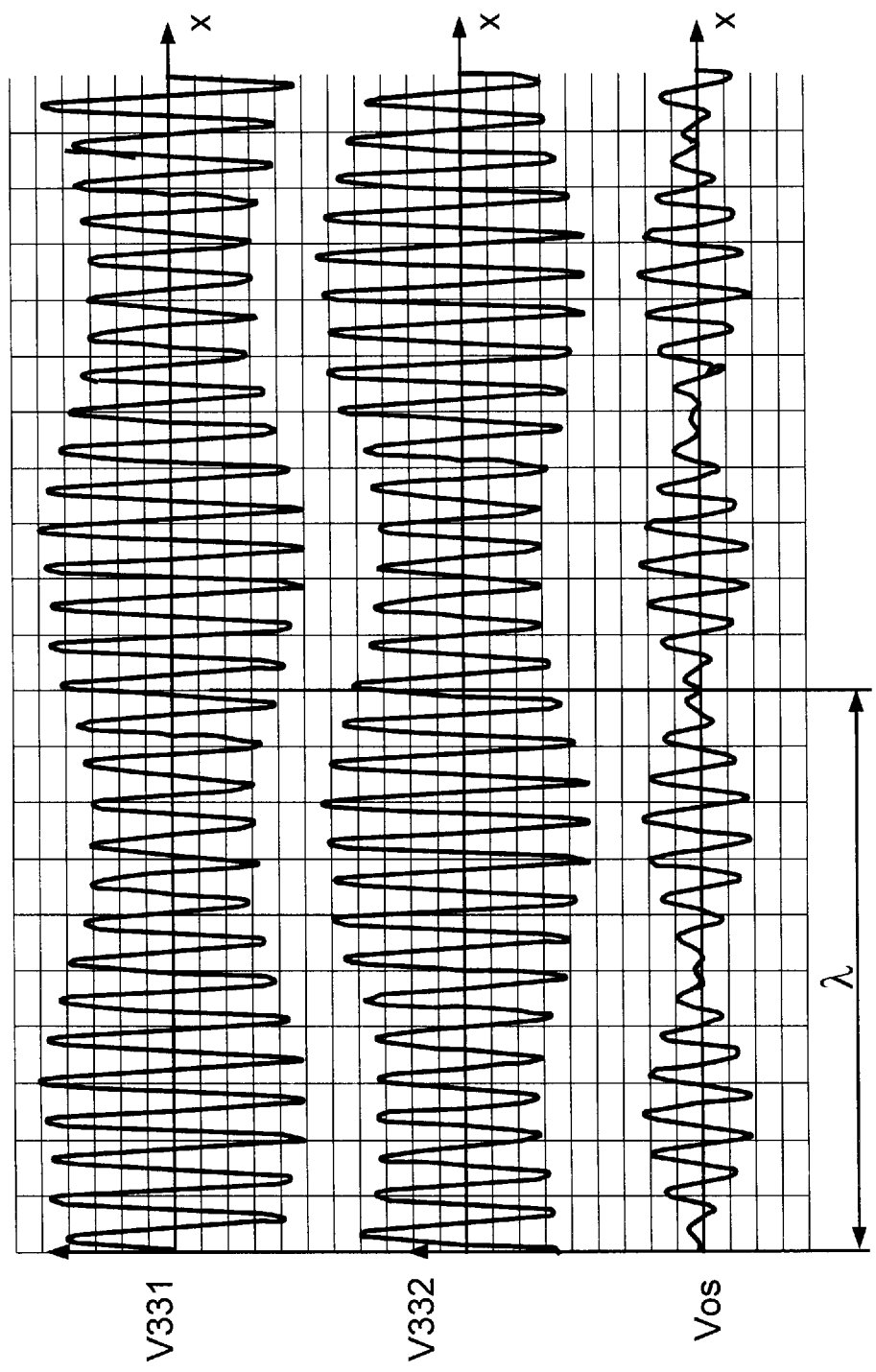
FIG. 5 is a graphic representation of the ideal voltages induced in the receiver coils of the receiver coil system shown in FIG. 3.

The following ideal voltages are induced in the receiver coils, depending on the relative position in the measuring direction X between the sensor structure and material measure (see diagram in FIG. 5).

$$V_{331} = K_{10} U_0 \sin \omega t + K_{11} U_0 \sin(2\pi x/\lambda) \sin \omega t \quad (1.2)$$

$$V_{332} = K_{20} U_0 \sin \omega t + K_{21} U_0 \sin(2\pi x/\lambda) \sin \omega t \quad (1.3)$$

and $$V_{321} = K_{10} U_0 \sin \omega t + K_{11} U_0 \sin(2\pi x/\lambda) \sin \omega t \quad (1.4)$$

$$V_{322} = K_{20} U_0 \sin \omega t + K_{21} U_0 \sin(2\pi x/\lambda + \phi) \sin \omega t \quad (1.5)$$

in which case: $\lambda$=graduation period, equivalent to electric angle $2\pi$ $K_{10}$, $K_{11}$, $K_{20}$, $K_{21}$ → transformer-like transmission coefficients $\phi$, the phase offset, being local.

In the simplified assumption: $K_{10}=K_{20}$ and $K_{11}=K_{21}$, the voltage in the two receiver coil pairs:

$$V_0 s = V_{331} - V_{332} = 2K_{11} U_0 \sin(2\pi x/\lambda) \sin \omega t \quad (1.6)$$

and $$V_0 c = V_{321} - V_{322} = 2K_{11} U_0 \sin(2\pi x/\lambda + \phi) \sin \omega t \quad (1.7)$$

Since it is mostly the case that $\phi = 2K\pi + \pi/2$ (in accordance with $n\lambda + \lambda/4$ geometric offset), and employing the convention that $$2\pi x/\lambda = \alpha$$

$$2K_{11} U_0 = K$$

the two ideal output voltages are represented in the following form:

$$V_0 s = K \sin \alpha \sin \omega t \quad (1.8)$$

$$V_0 c = K \cos \alpha \sin \omega t \quad (1.9) \text{ (as in the diagram of FIG. } 6a)$$

Figure 6A:
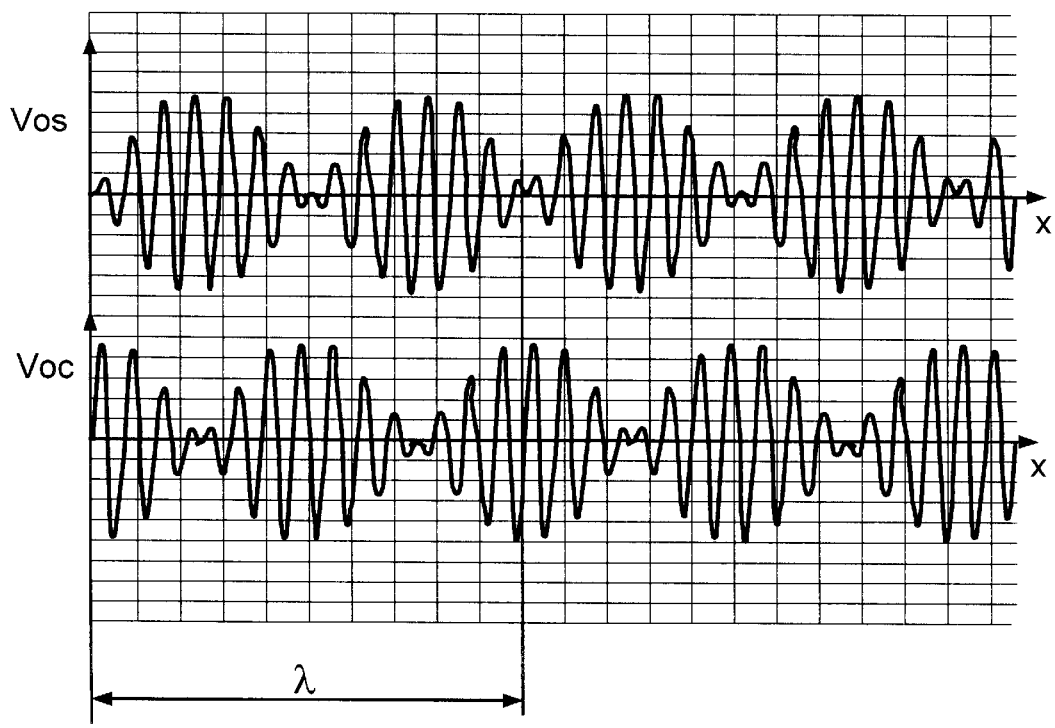
FIGS. 6a–b are graphic representations of two ideal output voltages before and after a demodulation.
Figure 6B:
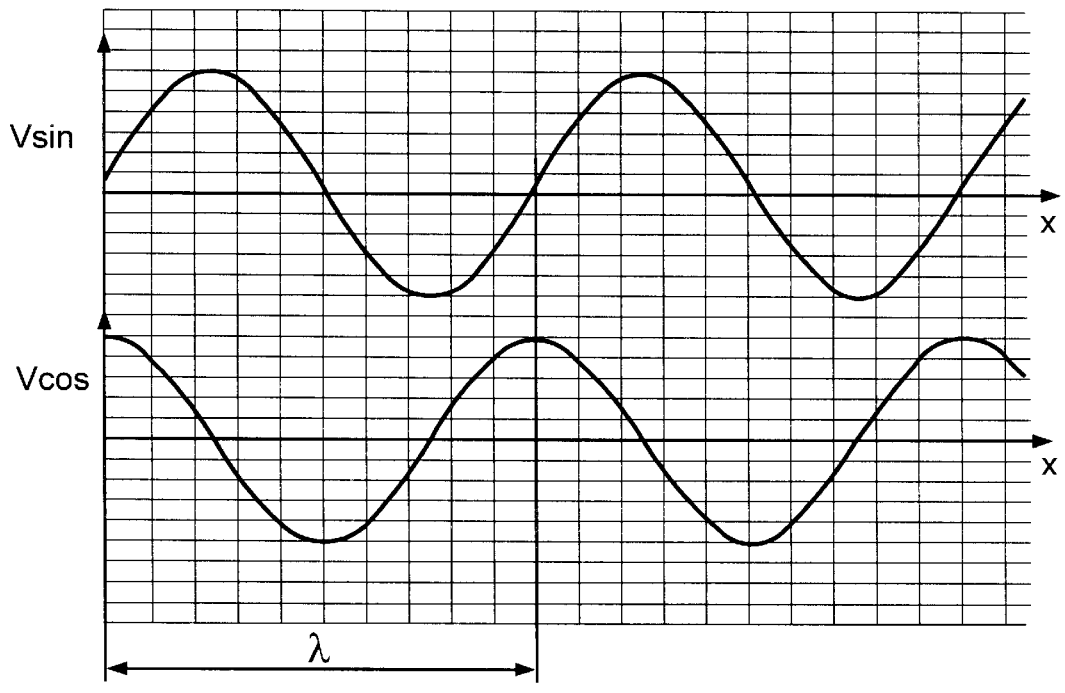

The exact positional information can be output from these two signals by the electronic evaluation system (FIG. 1) after conditioning, demodulation (FIG. 6b) and, if appropriate, rectangular conversion using the ratiometric method with refined resolution (interpolation). This gives rise to the need for the sensor structure to generate two phase-shifted signals by means of two receiver groups placed offset in the measuring direction.

Such a coil structure, in conjunction with the measuring scale, can also be operated in related inverse way by feeding the "receiver coils" and evaluating the signal induced in the "emitter coils". Two variants can be mentioned, in turn, in this mode of operation. In a first variant, the "sinusoidal and cosinusoidal receivers" are supplied with a signal of the same phase and amplitude, and a positionally dependent signal of modulated amplitude is induced in the "emitter coil system", or in the second variant the "sinusoidal and cosinusoidal receivers" are supplied with two signals of the same amplitude and shifted in phase by 90°, and a positionally dependent signal modulated in phase is generated in the "emitter coil system".

All further provisions hold for all modes of operation and functional principles, and depend on the various designs only as regards the dimensioning of the device. For this reason, only the firstly described embodiment will be pursued further as an example.

In principle, the methods of evaluation are within the discretion of a person skilled in the art, and can easily be adapted by the latter with knowledge of the invention and be fitted to the conditions respectively occurring. For this reason, they are not explained in detail here, but only additional special functions of an electronic evaluation system are treated.

The principal object of the invention is to determine sensor structures which supply measurement information with extremely slight deviations from the ideal signals (equations 1.8 and 1.9), and are largely independent of environmental influences and fluctuations (d) in distance within technically acceptable tolerances.

Some possible coil arrangements within the sensor structures are analyzed below, it being demonstrated thereby that only a structure which is self-compensated by specific measures is capable of achieving high measuring accuracies. These compensation variants will now be explained.

The following nomenclature is used to simplify the representation:

E, Ei—emitter coil
B, Bi—induction
S+—sinusoidal coil element 0° electric
S−—sinusoidal coil element 180° electric ($\lambda/2$ geometric offset corresponds)
C+—cosinusoidal coil element 0° electric
C−—cosinusoidal coil element 180° electric.

In general, it is assumed for the further consideration that, as a multi-ply flat design, a coil system comprises one emitter coil (single-emitter system) or a plurality thereof (multiemitter system) and two receiver channels, the latter being inductively coupled to the emitter(s), in order to supply electric signals offset by $\lambda/2$ ($\lambda/4$ geometric).

A receiver channel comprises at least one group of two coil elements which are offset by $\pi$ electric ($\lambda/2$ geometric) and interconnected differentially, but for simultaneous scanning of a plurality of scale periods such that, in order to suppress the individual graduation deviations, and for a higher signal gain usually an average is formed from a plurality of groups which are placed around an integral period "$n\lambda$" and connected in series. Furthermore, in order to simplify the description a receiver channel is frequently represented with only a single coil group.

Figure 4:
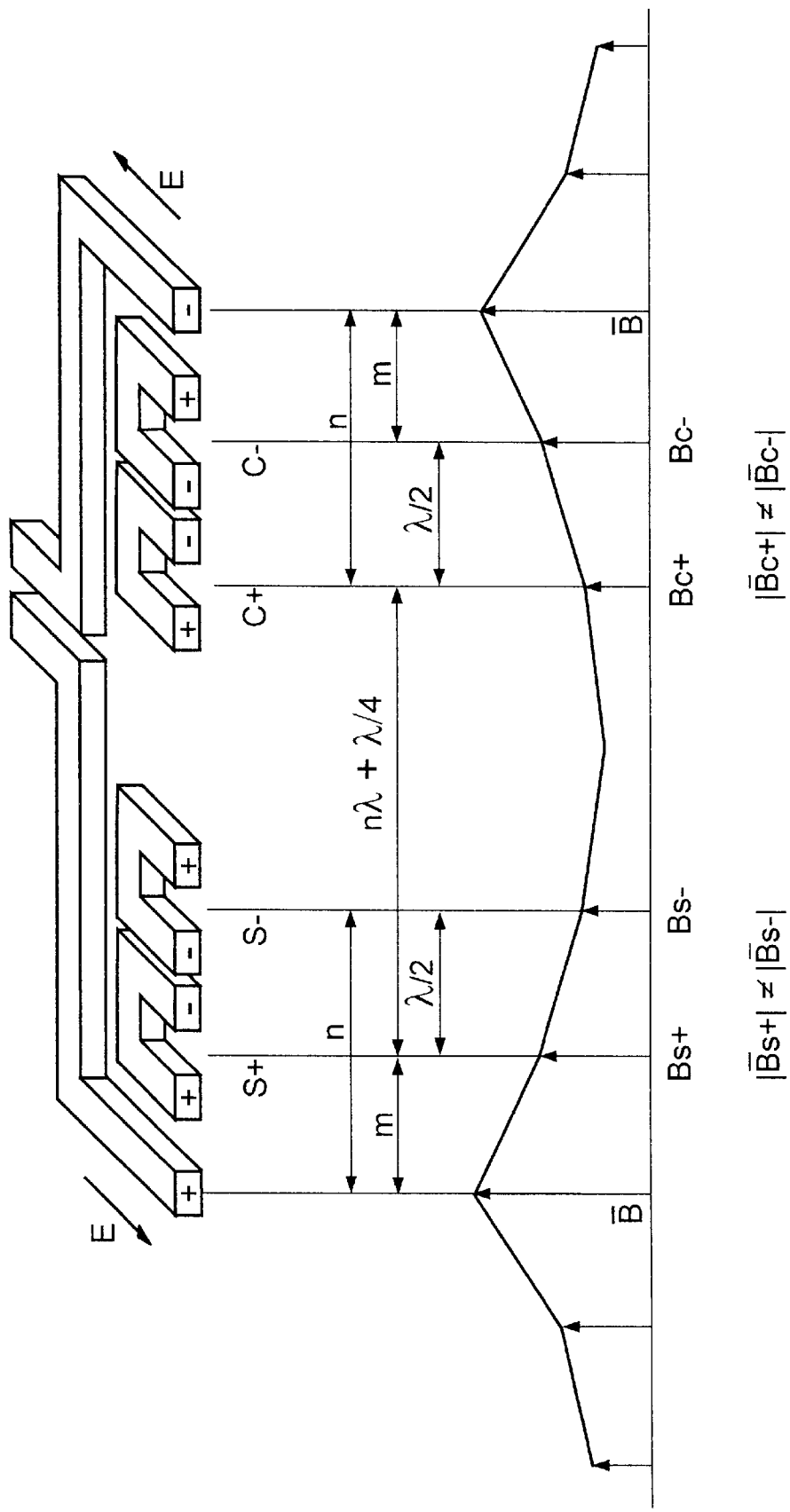
FIG. 4 is a graphic representation for explaining a single-emitter basic structure.

A single-emitter basic structure is illustrated in FIG. 4, the overall windings of a coil having been drawn as a single conductor track. An electromagnetic field whose intensity characteristic in the receiver plane (S+, S−, C+, C−) is illustrated in the diagram is provided for supplying the emitter coil with a primary AC voltage (equation 1.1). It is evident that a constant intensity cannot be realized due to the field gradient, and that the field is stronger in the vicinity of the emitter conductor track region, and decreases substantially in the direction of the center of the emitter coil.

Assuming that the receivers of the sinusoidal or cosinusoidal group are positioned as in FIG. 4, and that all receiver coil elements have the same number of turns per unit length, their geometric offset in the emitter field produces the induction:

$$Bs+ \neq Bs-, \quad Bc+ \neq Bc-$$

which leads to different "secondary voltages", on each individual coil element axis. These signals are modulated in the event of a relative movement in the measuring direction of the coil structure with respect to the measuring scale. The subtraction of the induced voltages in the coil elements S+, S− and C+, C− is aimed at completely eliminating the unmodulated signal component (equations 1.2 and 1.3), as in equations 1.6 and 1.7.

Figure 7:
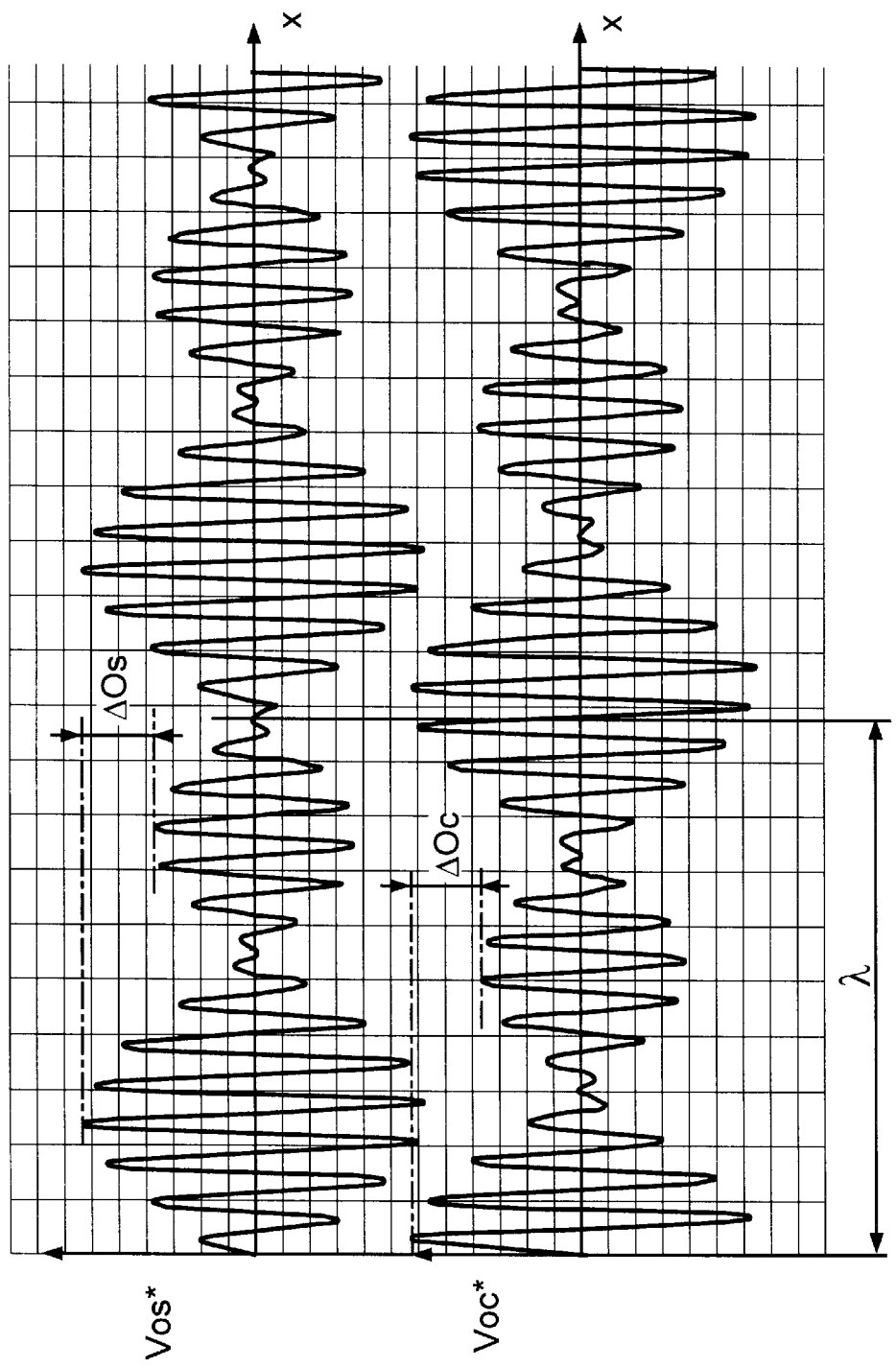
FIG. 7 is a graphic representation of signals affected by offsets.

However, as long as there is a functional requirement for the coils to be offset from one another in the receiver plane, such a coil arrangement supplies signals as illustrated in FIG. 7 which are subject to being offset, since $K_{10} \neq K_{20}$. In this illustration, the offset of the sinusoidal channel is denoted by $\Delta Os$, and that of the cosinusoidal channel is denoted by $\Delta Oc$, and constitutes a deviation from the ideal signals. Since the primary field distribution is also influenced by changes in distance (dimension "d" in FIG. 3) between the scanning unit and the measuring scale, which are to be expected during operation of such a system, within specific tolerances, the induction difference (Bs+−Bs−) and (Bc+−Bc−) does not remain constant. Values $\Delta Os$ and $\Delta Oc$ thereby become variable.

These offset changes caused by distances cannot be compensated in the electronic evaluation system, the result being that of inaccuracies in the measuring system.

Figure 8A:
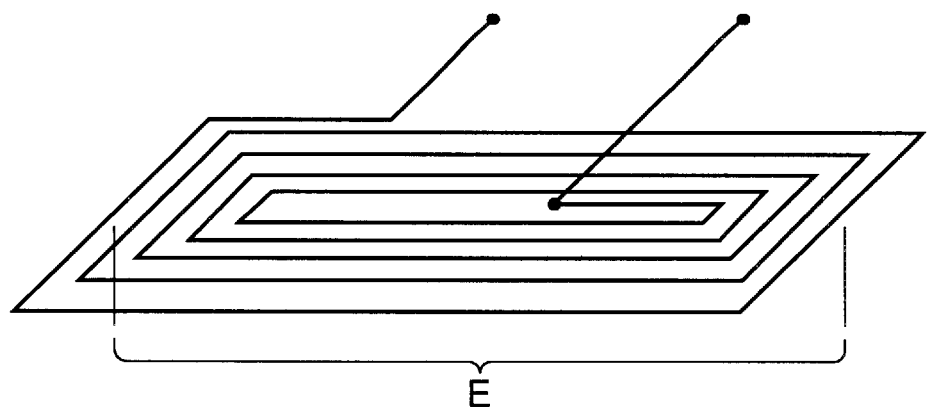
FIG. 8a is an illustration of a single-emitter basic structure in which the windings of the emitter coil cover the entire sensor scanning surface.
Figure 8B:
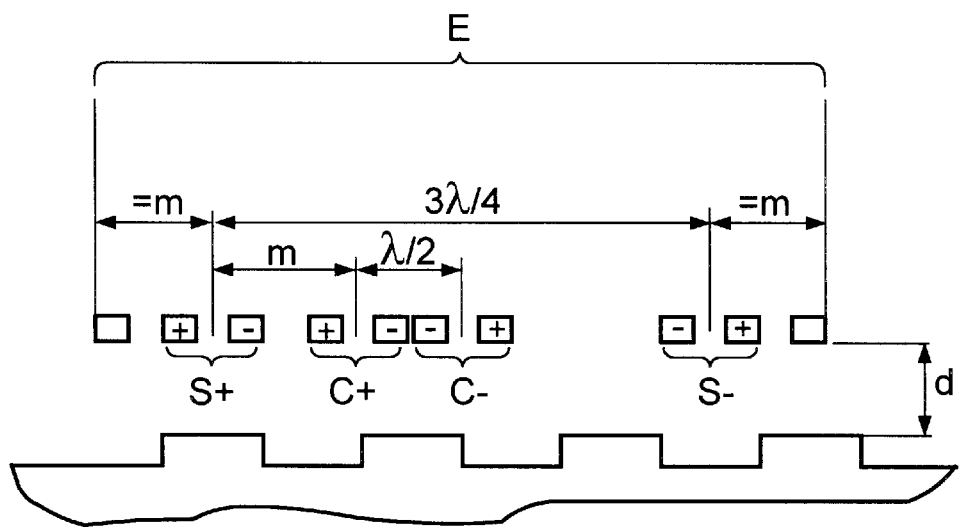
Figure 8C:
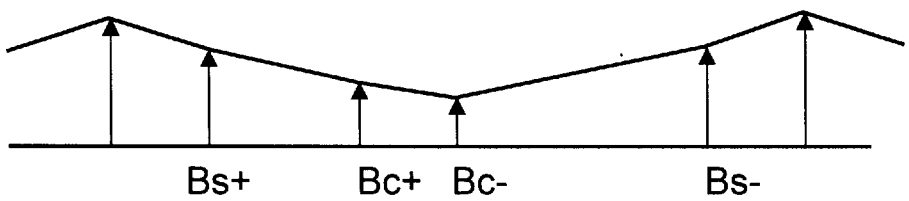
FIG. 8c is a graphic representation of a field distribution which is not uniform in the receiver plane.

A single-emitter basic structure is also illustrated in FIG. 8, the windings of the emitter coil covering the entire sensor scanning surface (FIG. 8a), and the receivers being located parallel to this plane. In this embodiment, as well, the field distribution is not uniform in the receiver plane (diagram FIG. 8c). A possible symmetrical placement of the sinusoidal elements S+, S− relative to the emitter geometry (dimension "m" FIG. 8b), for example, leads to identical inductions in their planes Bs+=Bs− and to an offset $\Delta Os=0$.

This does not, however, solve the problem, since the cosinusoidal coils due to functional reasons are required to be positioned offset from the sinusoidal coils, and are therefore no longer symmetric relative to the emitter Bc+≠Bc−, which leads to an offset $\Delta Oc \neq 0$.

Figure 9A:
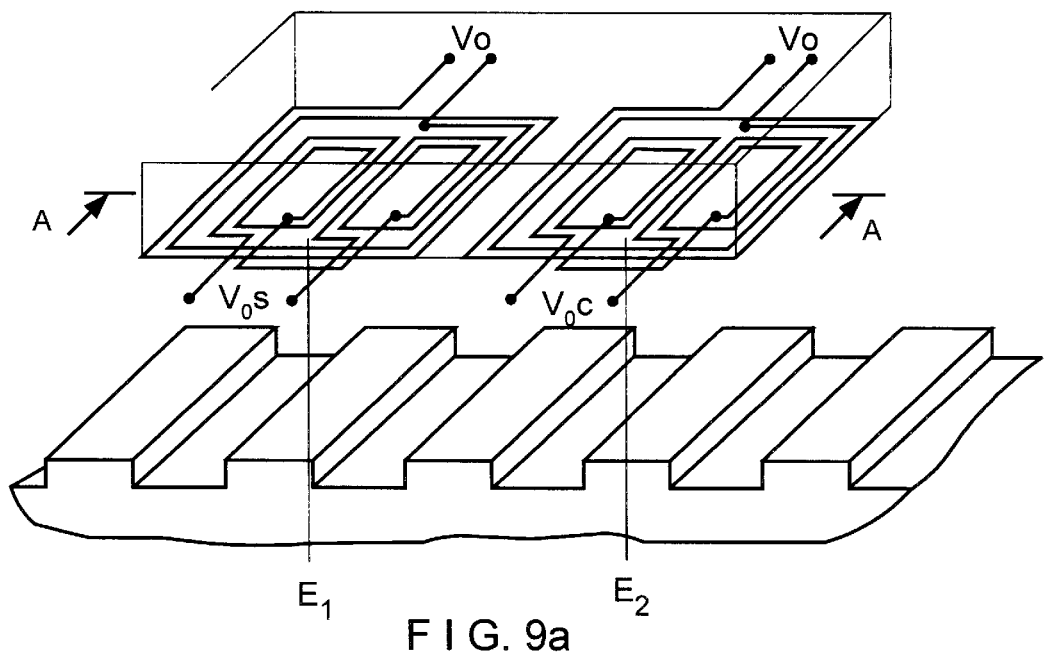
FIG. 9a is a representation of a multiemitter structure.
Figure 9B:
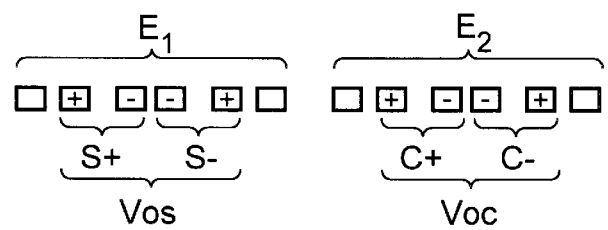
FIG. 9b is a graphic representation of the associated coil group.

A multiemitter structure as illustrated symbolically in FIGS. 9a and 9b comes into consideration in a further example. In this embodiment, each receiver channel is excited by dedicated emitter coils. The overall principle is valid exactly as if a receiver channel were to comprise a plurality of coil groups, and each group with its two differential coil elements were excited by a dedicated emitter or, in a further extension, each individual element were coupled to its dedicated emitter.

Figure 9C:
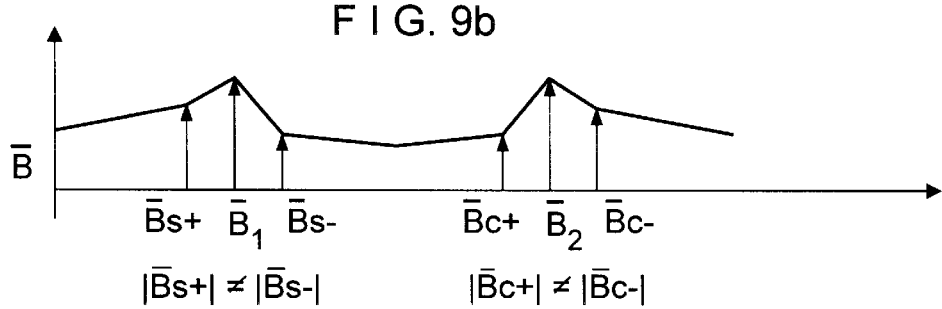
FIGS. 9c–d are graphic representations of different inductions in the elementary coil planes.
Figure 9D:
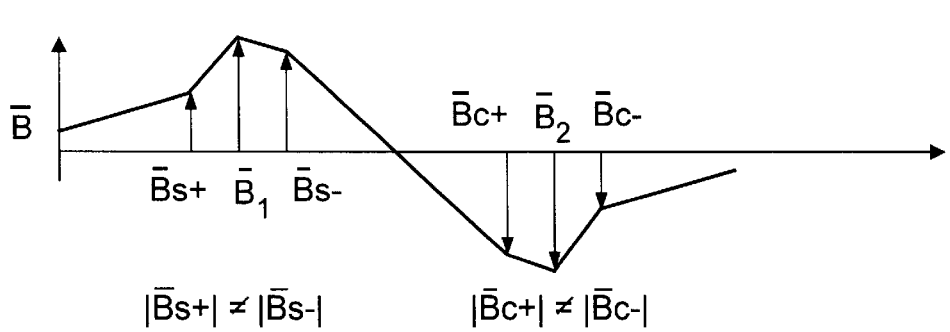

Owing to the symmetry and equal number of turns per unit length, the appropriate receiver channel would generate an offset-free signal in this arrangement when only one of the two emitters E1 or E2 is fed. However, when due to functional requirements both emitters are active, the interactions in both possible directions of induction (same direction FIG. 9c, opposite direction FIG. 9d) produce different inductions in the elementary coil planes Bs+≠Bs− and Bc+≠Bc−, and thereby signals affected by offsets. It is also evident that no other combination leads to a solution, including the case of mixed coil elements of two channels on one emitter.

An extended multiemitter structure in a four-emitter embodiment is illustrated in FIG. 10. Here, as well, for the same directions of induction (FIG. 10a) and for opposite directions of induction (FIG. 10b), the influences of the two final emitters in the overall sensor structure lead to a nonuniform distribution of field intensity. This also holds for multiemitter structures with a large number of emitters.

Figure 1:
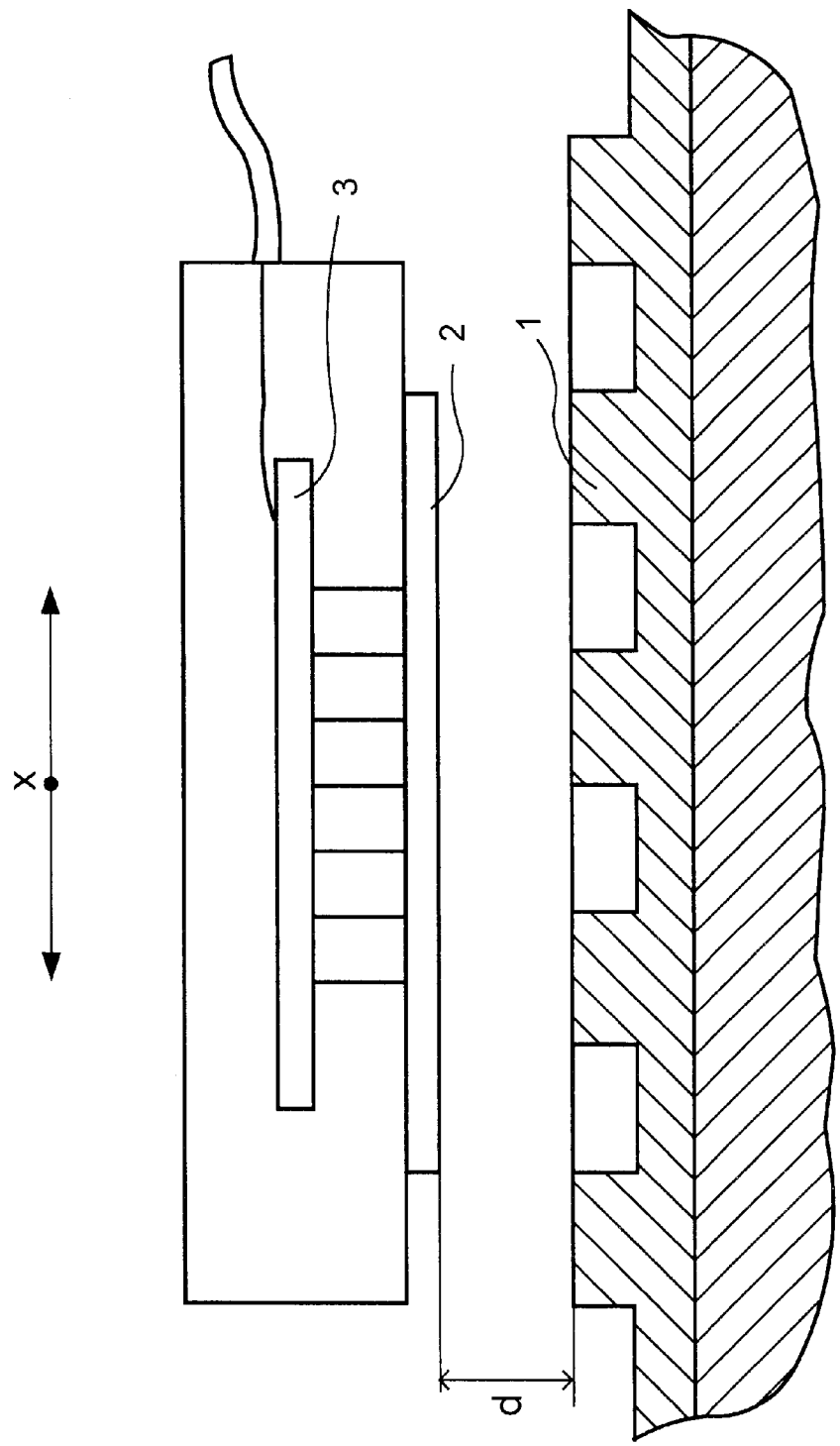
FIG. 1 is a schematic representation of a measuring device according to the invention.

It follows from all the previous variant embodiments analyzed that compensated output signals can be yielded only by a sensor structure which is inherently compensated by structural measures, in conjunction with the measuring scale and electronic evaluation system (FIG. 1). In order to emphasize the importance of compensation, it may be pointed out that the modulated useful signal of a coil element (equation 1.2) is smaller by a factor in the range of ~10 to 100 (K11<<K10) than the carrier signal, and that the subtraction with the paired element must press the carrier signal very accurately to the zero offset.

These compensation measures relate to the geometries, the number of turns per unit length and the shape and the relative positions of the emitter and receiver coils inside the structure. As a result, even though the individual coil elements are excited with different field strengths, an offset-free signal is generated per measuring channel by means of interconnected elements after the subtraction and summing of the total signal.

Some examples of compensation methods will be explained below. A single-emitter structure with a plurality of receiver elements for forming the two measuring channels SINE and COSINE is illustrated in FIG. 11. The interconnection of the individual coil elements yields the two measuring signals in the following way:

$$Vos=(S_{1+}-S_{1-})+(S_{2+}-S_{2-})+ \ldots +(S_{i+}-S_{i-})+(Sn_+-Sn_-)$$

and $$Voc=(C_{1+}-C_{1-})+(C_{2+}-C_{2-})+ \ldots +(C_{i+}-C_{i-})+ \ldots (Cn_+-Cn_-)$$

As already explained, the exciter field is not equally strong in the receiver plane. In order to counteract this nonuniformity, it is possible, as illustrated in FIG. 12, for the individual coil elements (in the case of Si+ and Si−) to have a different number of turns per unit length ni+≠ni−. The ratio ni+/ni− is inversely proportional to the induction ratio Bi+/Bi− appropriate to these coil elements, and so equal voltages (in absolute value) are induced for these two coils in the absence of the measuring scale, which does, after all, influence these currents as a function of position.

Up to an arbitrary degree of accuracy, this method can be used in the coil structure to calculate the coil element pairs $S_{1+}$, $S_{1-}$, and $C_{1+}$, $C_{1-}$, up to $Cn_+$, $Sn_-$ and $Cn_+$, $Cn_-$, in which case symmetry yields $n_{1+}/n_{1-}=n_{n+}/n_{n-}$ for the first and last pair, and this continues analogously up to the axis of symmetry of the emitter. Evidently, it holds that the difference $\Delta 1 > \Delta i$ where $\Delta 1=|n_{1+}-n_{1-}|$ and $\Delta i=|n_{i-}-n_{i+}|$, and that is reduced continuously from both sides in the direction of the structural axis.

An equivalent compensation method for the single-emitter structure illustrated in FIG. 11 is the adaptation of the receiver coil surface (FIG. 13a) in a fashion inversely proportional to the exciter field strength, such that the same magnetic field fluxes are achieved for the two differential elements of a coil pair through different receiving surfaces $A_{i+} \neq A_{i-}$ for different $B_{i+} \neq B_{i-}$. Changing the coil dimension "1" perpendicular to the measuring direction has only a quantitative influence on the signal induced in this coil, and renders the abovementioned adaptation possible. An even finer flux adaptation can also only be achieved by geometrically changing one or a few turns of a coil (see FIG. 13b).

A third compensation method of a single-emitter structure is illustrated in FIG. 14. This concerns additional receiver elements such as k sin and k cos, placed outside (FIG. 14a) or inside (FIG. 14b) the emitter surface in the measuring direction, which counteract the corresponding inner receiver elements through the signals induced in them, such that the interconnection leads per channel to a compensated, offset-free signal. Use may be made in this case of all previously described compensation methods such as adapting the number of turns per unit length and the receiver surface.

As may be observed in the illustration (14a), the compensation coils k sin and k cos are in opposition of phase with respect to the corresponding, sinusoidal receiver coil S and consinusoidal receiver coil C under the emitter coil E. The phase displacement, i.e., the electrical offset between the coils outside the emitter coil k sin and k cos is with reference to the corresponding sinusoidal coil element and the consinusoidal coil element of the emitter coil.

Figure 15:
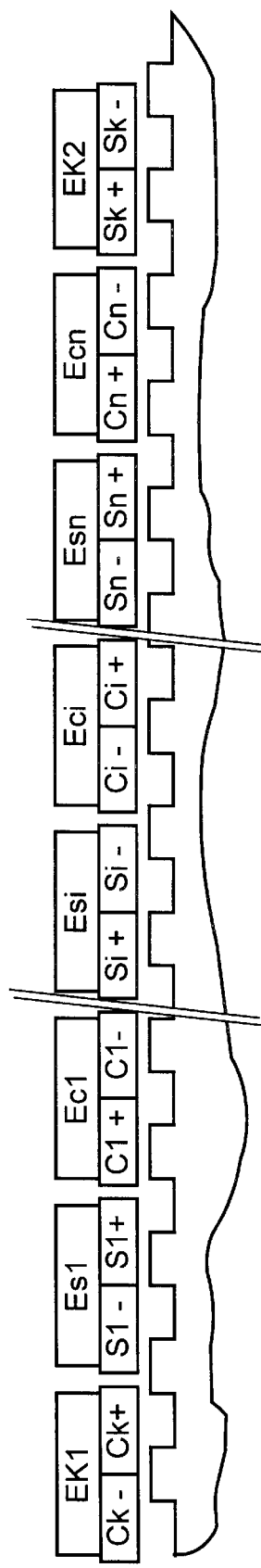
FIG. 15 is a representation of a multiemitter structure.

A multiemitter structure is illustrated in FIG. 15. As already mentioned, a nonuniform total field distribution is yielded by the concatenation of the individual emitter fields. A first compensation method presented here provides additional compensation emitters EK1 and EK2 coupled to the compensation receivers ($C_{K+}$, $C_{K-}$ and $S_{K+}$, $S_{K-}$). The latter can differ from the other analog emitters and receivers in terms of their surface and (or) number of turns per unit length, possibly also turns direction. As a result of these differences, the counteraction of these compensation signals suppresses their deviations in the overall structure, with interconnected elements.

Figure 16:
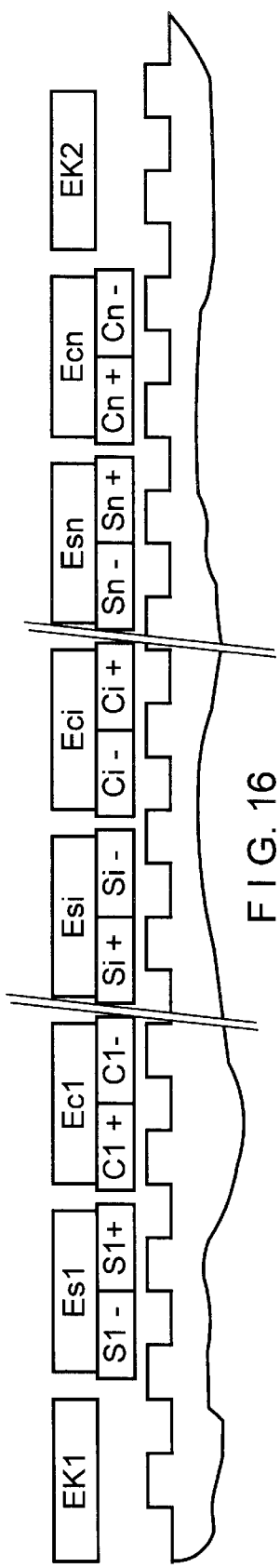
FIG. 16 is a variant of the multiemitter structure of FIG. 15.
Figure 17:
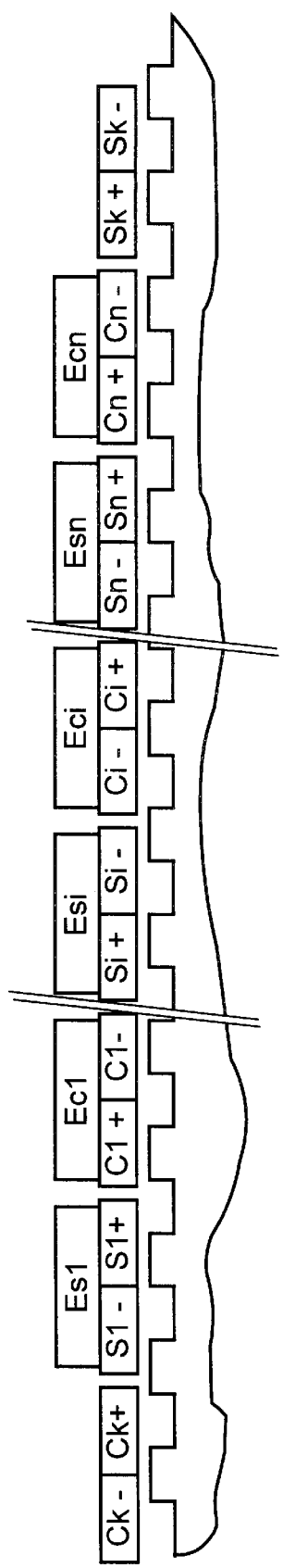
FIG. 17 is a variant of the multiemitter structure of FIG. 15.

In two variants of this arrangement which are further illustrated in a simplified form, either only additional emitters (FIG. 16) or additional receivers (FIG. 17) are used as compensation elements. The signal offset values present without these compensation elements are compensated in a similar way to that described above.

Figure 18:
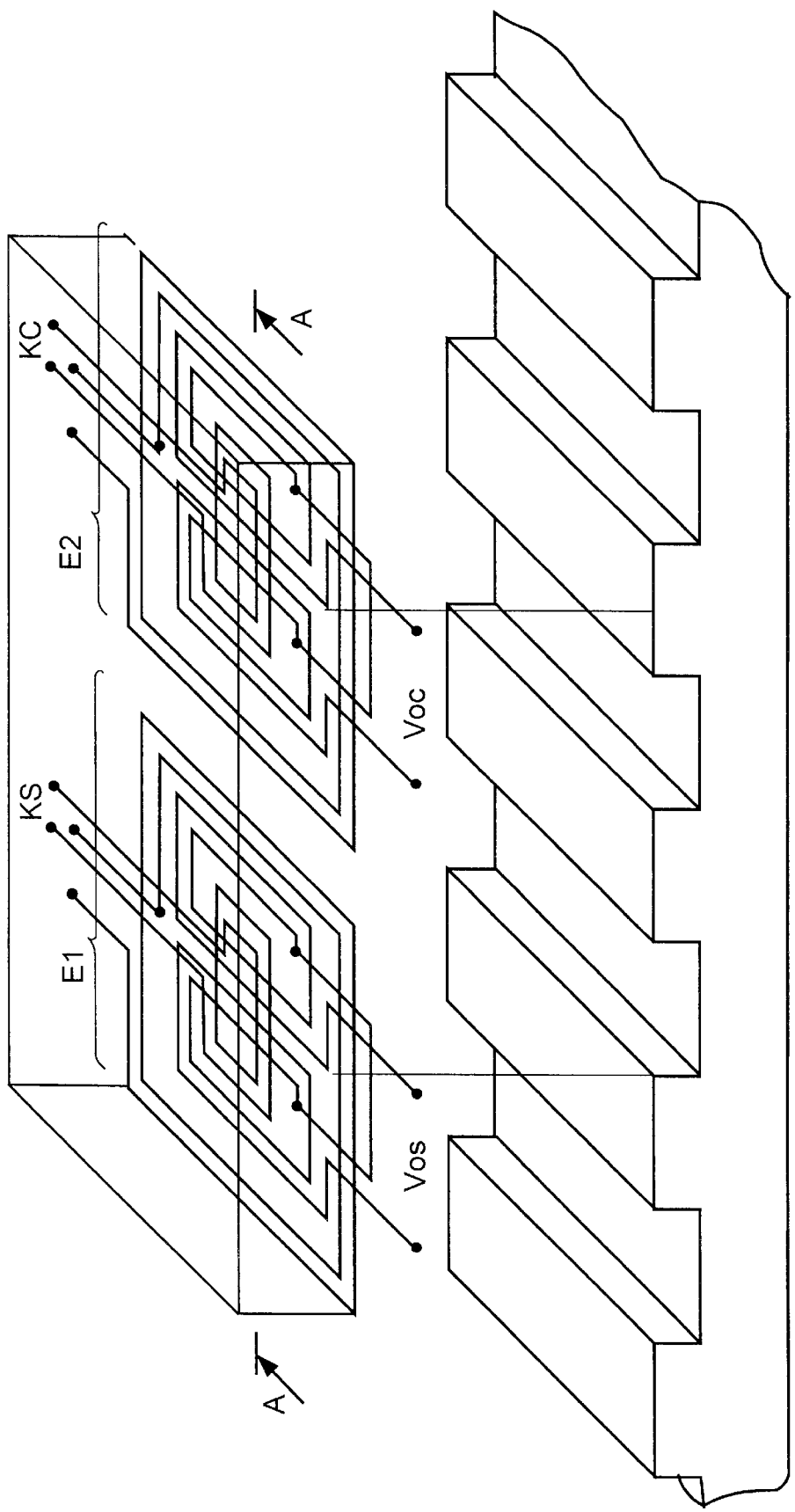
FIG. 18 is an axonometric illustration of an emitter structure.

Illustrated in FIG. 18 (axonometric illustration) and FIG. 19 (structural cross section and considerations of induction) is another compensation method, which can be used for both single-emitter structures and multiemitter structures. In this design, the structure has compensation coils KS and KC arranged in a plane parallel to the planes of the other coil elements. Owing to the corresponding supply, geometry and position of these compensation coils, it is possible to generate in the receiver plane additional inductions ($\overline{B}ks+$, $\overline{B}ks-$ and $\overline{B}kc+$, $\overline{B}kc-$) which act against the deviations of the standard emitters $\Delta s=(\overline{B}s+-\overline{B}s-)$ and $\Delta c=(\overline{B}c+-\overline{B}s-)$ and lead to a uniform total exciter field after the superimposition of their effects: $(\overline{B}_T s+)=(\overline{B}_T s-)$ and $(\overline{B}_T c+)=(\overline{B}_T c-)$. It holds in this case that: $(\overline{B}s+)+(\overline{B}ks+)=(\overline{B}s)+(\overline{B}ks-)=(\overline{B}_T s+)=(\overline{B}_T s-)$ and $(\overline{B}c+)+(\overline{B}kc+)=(\overline{B}c-)+(\overline{B}kc-)=(\overline{B}_T c+)=(\overline{B}_T c-)$ (see vector diagram 19a and 19b).

Figures 19A, 19B:
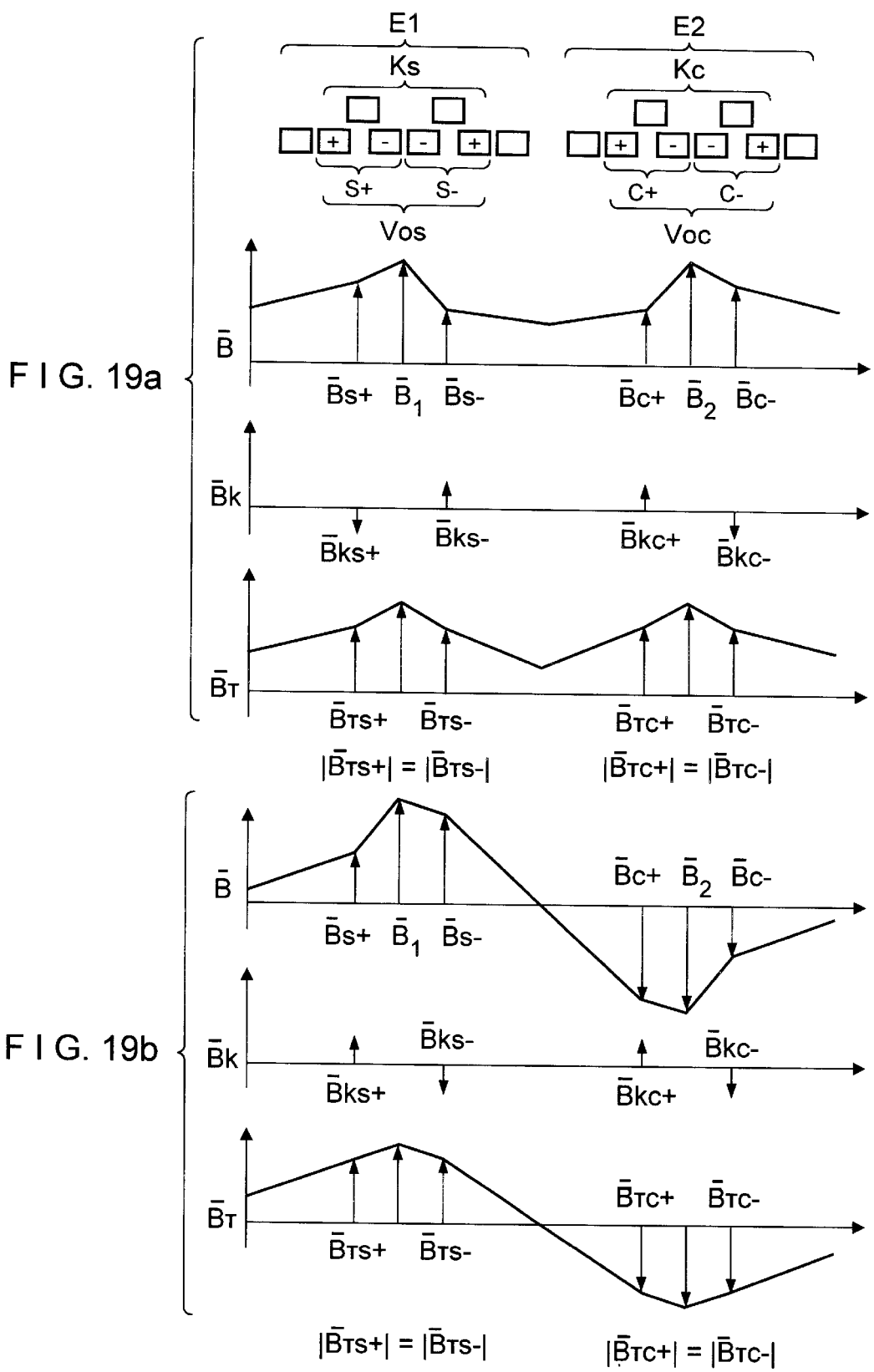
FIGS. 19a–b show a structural cross section and considerations of induction of two emitters with the same direction of induction and with oppositely directed direction of induction.

The design of two emitters with the same direction of induction is illustrated in FIG. 19a, and that of two emitters with oppositely directed direction of induction is illustrated in FIG. 19b. In both cases, the standard emitter inductions B are firstly illustrated with their positional deviations, and then the compensation inductions Bk and the totally compensated induction BT are illustrated.

Solutions for suppressing signal offsets were presented for all these previously described structures.

However, for a high resolution measuring system the signals generated must also have a good "sinusoidal content", which means that the positionally dependent harmonics (also termed total harmonic distortion) must be reduced to a minimum. It can be calculated theoretically that, depending on the mode of operation and geometries, for the previous ideal structures the induced signals superimposed on the local principal sinusoidal oscillation are affected in different proportions by even and odd harmonics.

If they are at a constant ratio to the principal wave, these harmonics could be suppressed by means of complicated electronic evaluation (such as, for example, a punctiform look-up table correction). However, since this ratio depends on the distance "d" (FIG. 3), they can scarcely be eliminated for the entire functional range, which is required however for high accuracies. It may be seen from this that in terms of harmonics, as well, only an inherently compensated structure can lead to the desired requirements.

It is possible to calculate that the measuring system transfer function can be influenced by specific geometrical measures. These measures are further explained as corrections to a theoretically ideal structure. For such a corrected structure, each interfering harmonic order can be suppressed specifically using one of the measures explained in more detail below. Fundamentally, a plurality of correction measures can be used for the same structure in order to suppress a plurality of harmonic orders by superimposition of the effects.

A first type of correction presented relates to the emitter coil geometry. In order to suppress a specific harmonic order, it is possible to influence in the receivers S+ and S– the induced signal shape of an emitter, such as is illustrated in FIG. 20*a*, with an ideal measure by means of the addition (FIG. 20*b*) or subtraction (FIG. 20*c*) value "k" in the emitter width in the measuring direction. It is also possible to achieve signal influences by means of the distribution of the individual windings in the emitter plane in a deviation from the regular distribution (FIG. 21*a*), as is illustrated in FIGS. 21*b* and 22*c*.

A second type of correction relates to the receiver geometry and the receiver position in the measuring direction. In FIG. 22*a*, the ideal receiver plane is illustrated in a simplified fashion for a single measuring channel (sine) comprising a plurality of receiver groups with dimensions. Various harmonics can be suppressed by a coil element width (FIG. 22*b*) changed by a correction "k", or coil elements—spacing in a receiver differential group (FIG. 22*c*) or by the spacings of the receiver groups in the receiver row (FIG. 22*d*), as well as by the distribution of the individual windings of a receiver coil element (FIG. 21*b*).

A third type of correction relates to the measuring scale. As illustrated in FIG. 23*a*, the ratio between the regions of high electric conductivity or low reluctance (dimension "a" in FIG. 3) and the regions of low conductivity or high reluctance (dimension "b" in FIG. 3) in a graduation period λ can also influence the signal shape. A specific harmonic order can be eliminated by the scale for a specific correction value "k" (FIG. 23*b*). The suppression of a harmonic order can be carried out in the measuring scale by virtue of the fact that, as described above, within the graduation period the boundary regions are at a specific angle $\beta \neq 90°$ to the measuring direction (FIG. 23*c*).

Given knowledge of the invention, a person skilled in the art is capable of determining all these harmonic correction values for a defined measuring system with its specific transfer function after the determination of the functional mode and the ideal geometry, coil structure, scale and requirements for accuracy.

An additional aspect with regard to the measuring system is the dependence of the signal amplitudes on the distance "d" of the coil structure from the scale (FIG. 3). Although, as already mentioned, the electronic evaluation system uses a ratiometric method to determine the electric angle α such that it is largely not the signal amplitudes to the two measuring channels, but only their ratio which is to be found directly in the result, these amplitudes can be kept approximately constant for the extension of the functional range by a method described further below.

Figure 24:
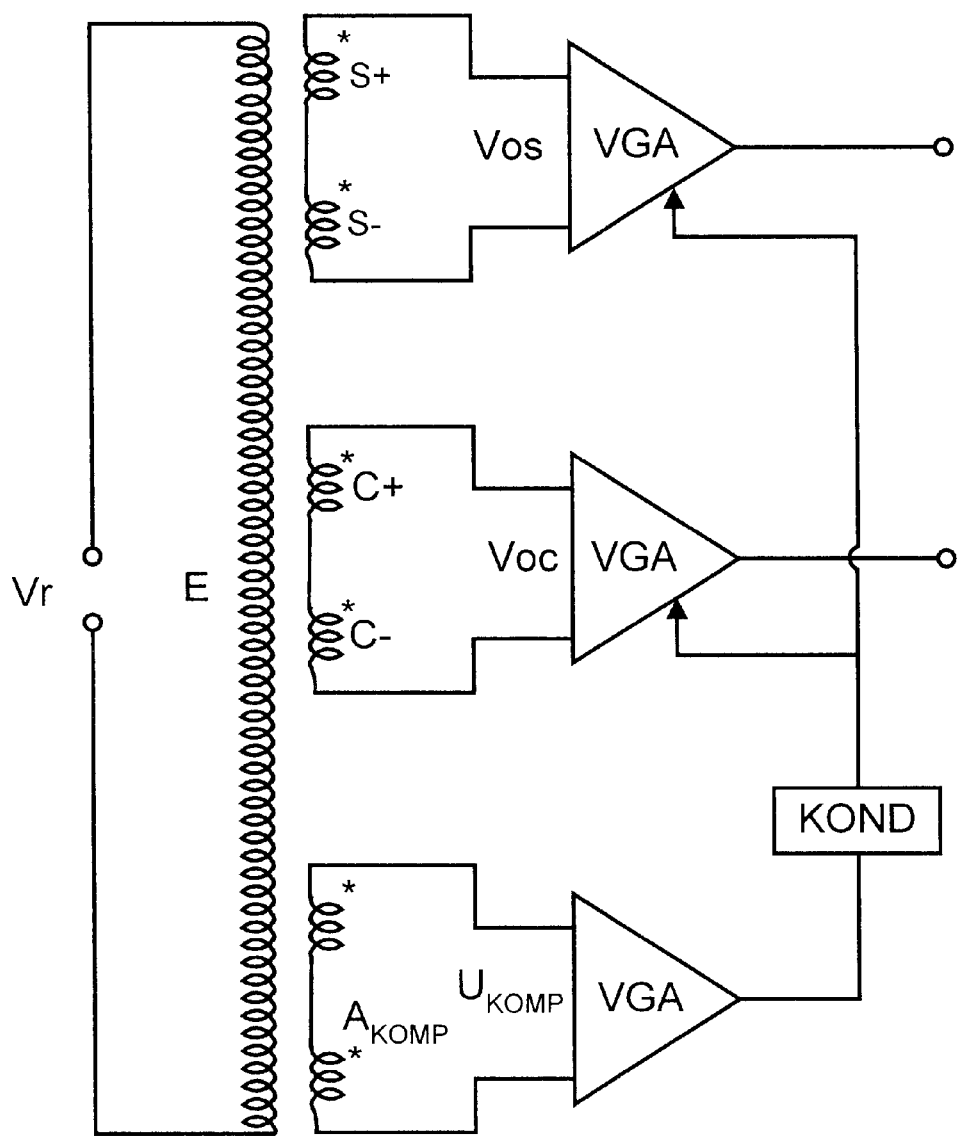
FIG. 24 is a block diagram permitting measuring signals to be processed by means of operational amplifiers in the input stage of an electronic evaluation system with variable gains.
Figure 25:
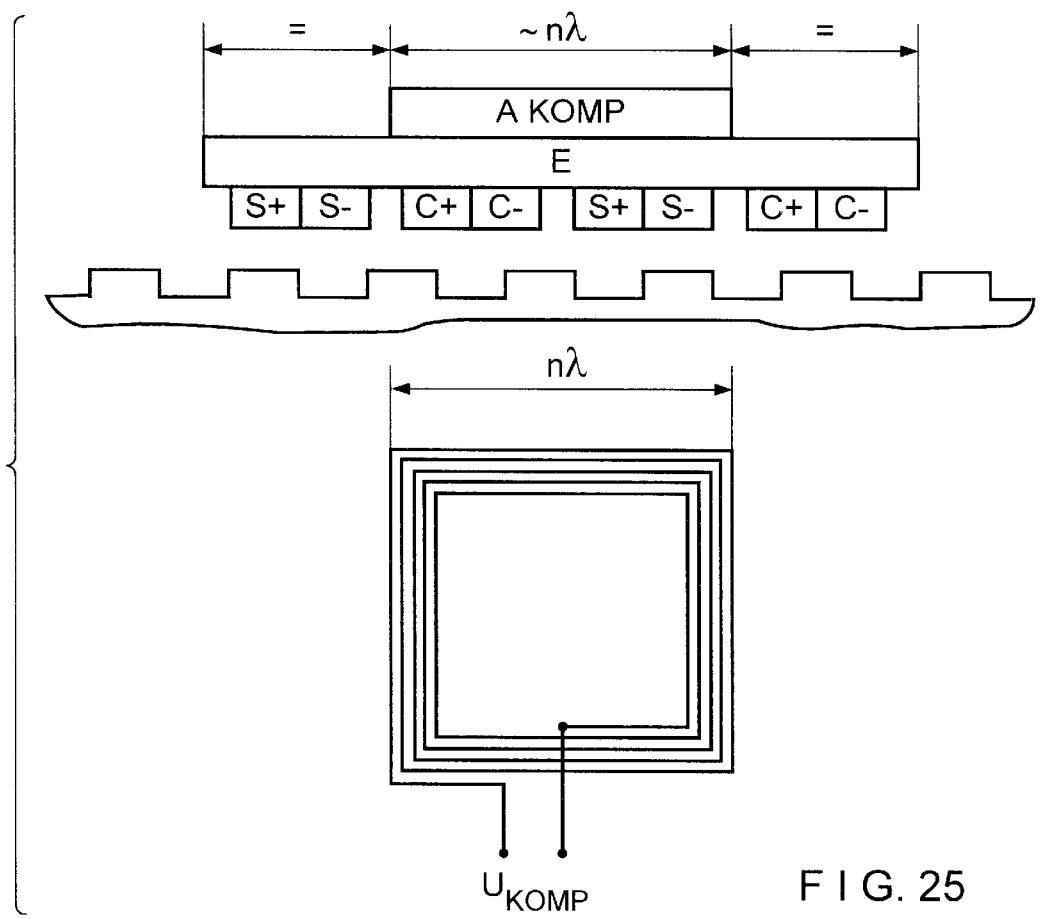
FIG. 25 is a graphic representation of an additional coil A komp.
Figure 26:
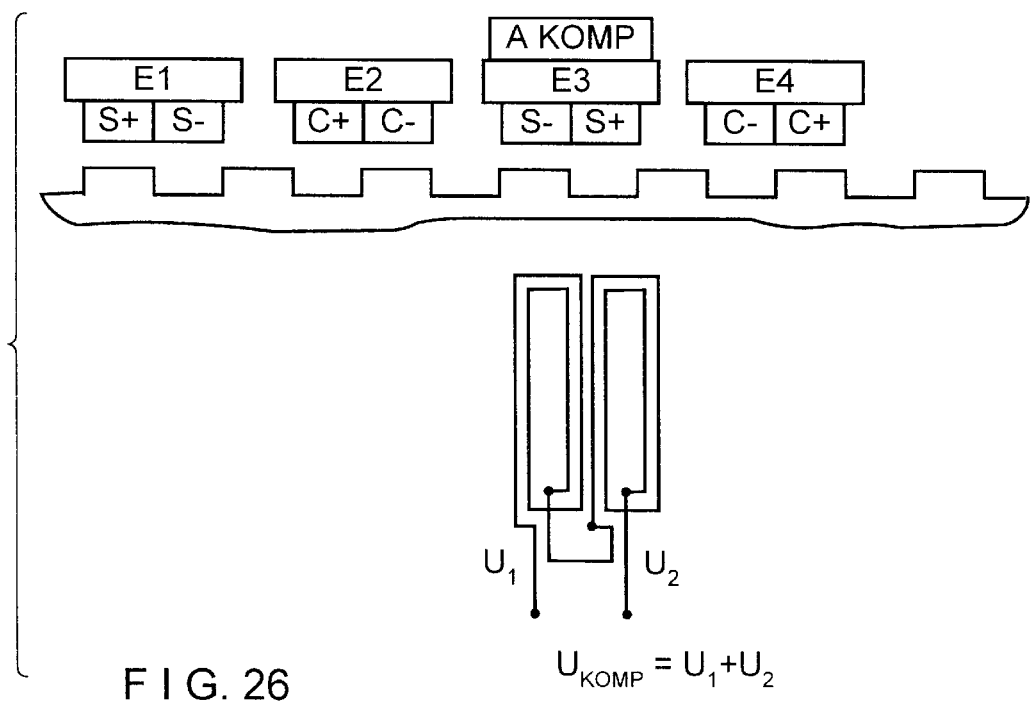
FIG. 26 is a graphic representation of another additional coil A komp.

FIG. 24 illustrates a block diagram which is used to process the measuring signals Vos and Voc by means of operational amplifiers in the input stage of the electronic evaluation system with variable gains. The gain is determined by the U komp signal after conditioning, and is proportional to the scanning distance between the measuring scale and the coil structure. The U komp signal is obtained by an additional coil A komp (FIG. 25, FIG. 26), which is located in a parallel plane to the emitter coil in the overall coil structure, and owing to its geometry supplies a distance-dependent signal (measure of the magnetic coupling between the emitter E and A komp) which is influenced exponentially by the distance "d". The coil A komp is configured such that its induced signal U komp is not modulated by movement in the measuring direction (for example a width of ~nλ as in FIG. 25). Since the U komp signal as well as the Vos and Voc decrease with larger distance "d", whereas the gain must be higher, this signal is to be appropriately conditioned before connection to the VGAs.

For the purposes of simplification, all methods of compensation and correction previously mentioned have been illustrated only for one coil plane, and the uniform designation of "coil" has been used. However, these methods are also valid by analogy when a coil comprises a plurality of coil layers positioned one above another and interconnected.

When realizing the design for producing a multi-ply coil structure, undesired capacitive couplings can arise in addition to the magnetic couplings from placing the individual coil planes one above another, depending on the operating frequencies and impedances. In order to avoid this and also to shield the entire structure from external influences, large-area metallic thin film planes S1 and S2 (FIG. 27) can be provided between the active coil planes and/or outside thereof. The structure is capacitively decoupled by connecting said thin film planes to a fixed potential.

Figure 29:
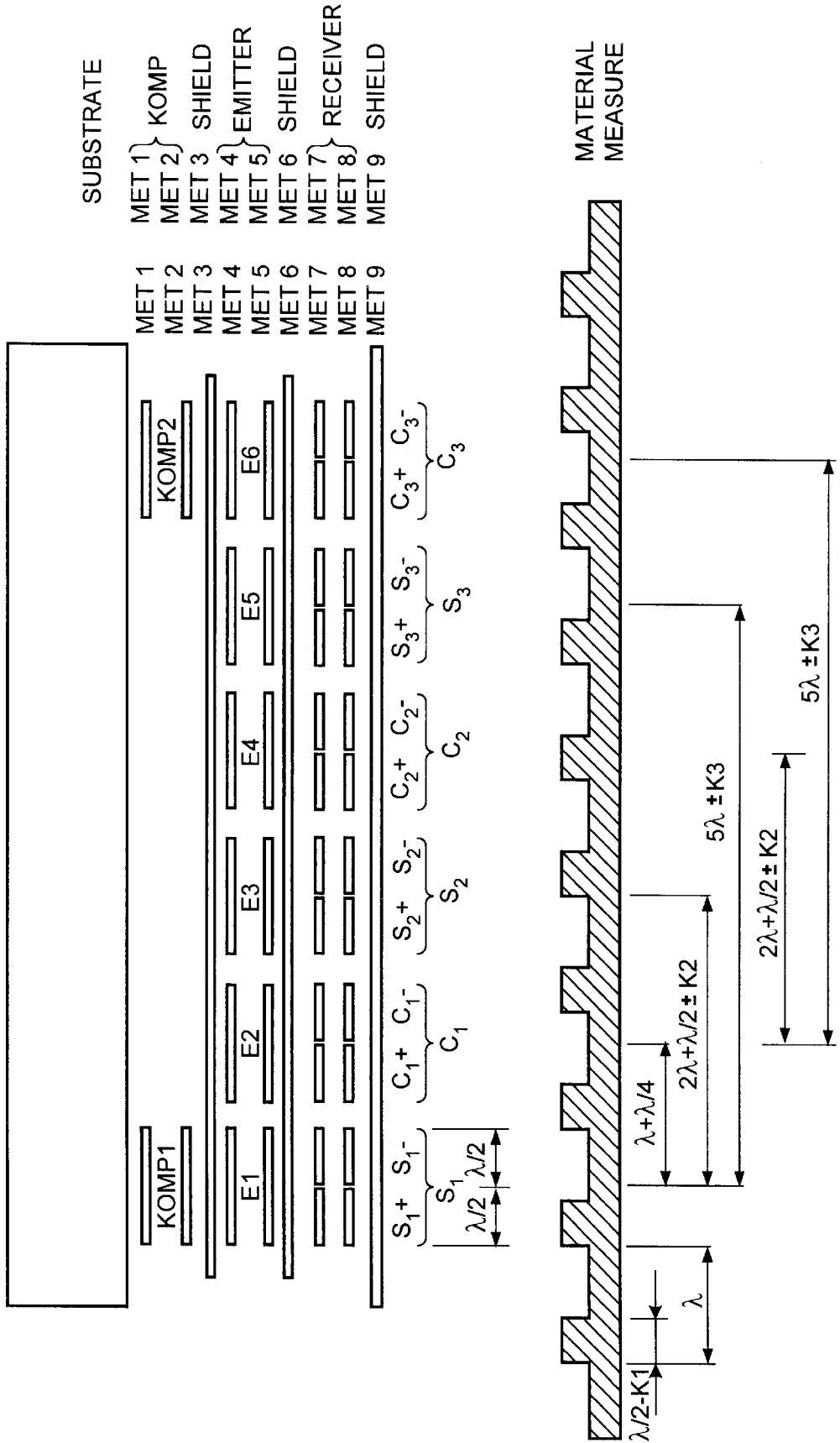
FIG. 29 is an example of a complete coil structure.

The Following may be Discussed as a Design Example:

Using an elementary coil as illustrated in FIG. 28, a design is described below as an example of the complete coil structure as illustrated in FIG. 29, only some of the previously explained compensation methods being used. Depending on the dimensioning of the system and on requirements, any desired other correction principles specified for each signal parameter can be applied in a common developed concept.

It is assumed for the further consideration that the coil structure comprises alternating metal (MET) and insulating (ISO) layers. The insulating layers have vias which implement the electric interlayer connections. This entire multilayer arrangement is constructed on a substrate, determined from a technical point of view, and connected via appropriate contacts to the supply unit and the electronic evaluation system. Such a multilayer arrangement can be implemented with the aid of known technologies in a way similar to the case of printed circuits, or by using photolithographic thin film technology.

If it is functionally necessary, the coil element in FIG. 28 can also be formed in a similar way in more than two metal planes. The measuring scale comprises a metal foil, made from iron or an iron alloy, magnetic or soft magnetic, or made from a nonferrous alloy on which there is etched a periodic structure (graduation) or, this being preferred because of the high accuracy of graduation which can be achieved, a foil which is etched congruently on two sides photolithographically, and is applied to a metallic or nonmetallic substrate.

The multiemitter coil structure illustrated in FIG. 29 and having the specified geometric relationships consists in the particular case (without limiting the practice thereto) of six emitters ($E_1$ to $E_6$) superimposed in each case on three "sine" and "cosine" receiver groups ($S_1$, $S_2$, $S_3$ and $C_1$, $C_2$, $C_3$) to which these are thereby inductively coupled. The distance compensation coils KOMP are inductively coupled to the emitters $E_1$ and $E_6$.

Shielding surfaces can be provided for capacitive decoupling between the coil levels.

The emitters are interconnected either all in series or in parallel and fed with AC voltage. It is also possible for said emitters to be interconnected only partly in the way set forth above. In this case, the remaining emitters are supplied in phase with the others, but separately. As a result, said emitters can be fed with different voltages (or currents) in order to achieve a desired uniformity of the exciter field.

These emitters (for example $E_1$ and $E_6$) are regarded as compensation emitters. The number of turns per unit length of the emitters can be realized either identically for all of them, or else differently, in a fashion symmetrical to the structural axis in the measuring direction, in order to compensate the individual emitter field interactions.

A receiver group (for example $S_1$) comprises two receiver elements ($S_{1+}$ and $S_{1-}$), which are differentially connected. Each of the two measuring channels "sine" and "cosine" is formed by the series connection of the corresponding groups.

As already explained earlier above, in addition to this first measure it is possible for the purpose of achieving a total offset-reduced signal for the receiver elements to be configured with different numbers of turns per unit length or geometries so as to compensate the emitter field gradient when there is no compensation owing to the nature of the emitter.

The ideal distances between the receiver coil groups of a channel (see FIG. 29) can be adapted, for the purpose of suppressing specific harmonics, by correction values (K2, K3), determined from the calculated transfer function.

The distance compensation signal, induced in the KOMP 1 and KOMP 2 coils (connected in series) has an amplitude which is inversely proportional to the distance of the coil structure from the measuring scale. This is intended not to be influenced, or to be influenced only slightly, by the relative movement thereof in the measuring direction (ripple phenomenon). This is achieved by adapting the compensation coil width, corrected by the ideal value (periodic integer).

A further interfering output signal harmonic can be suppressed in the measuring scale by the correction K1.

In order to simplify the system, it is, of course, also possible to use few metal layers to realize the coil structure, depending on the accuracy requirements.

For the sake of completeness, reference may further be made to a rotational embodiment:

All the definitions for the length measuring system can be used identically for recording angular measurements. The sole difference resides in that the measuring scale constitutes a cylindrical part (No. 1 in FIG. 30), and the coil structure is implemented in a curved fashion or as a polygonal surface concentric with the measuring scale (No. 2 in FIG. 30).

Since such measuring systems have already been developed and designed in the prior art with the aid of appropriate computer programs, the person skilled in the art is capable, given knowledge of the invention, of equipping the respectively used computer programs with modules and/or routines which undertake the corrections according to the invention. It is perfectly possible in this case to follow an iterative approach in which, for example, corrections according to the invention are undertaken to a prescribed extent, the improvement thereby achieved is scrutinized and the correction (of the correction) still required is undertaken until the results obtained are within the range of the targeted results. Of course, given knowledge of the invention, it is also possible to undertake an analysis of the required correction in order already to arrive at the desired result in the first step.

What is claimed is:

1. An inductive measuring device for detecting position, comprising a coil structure and a measuring scale having at least one graduation of variable reluctance or conductivity, wherein the coil structure comprises a combination of coils including at least one emitter element and a plurality of receiver pairs, said at least one emitter element and said receiver pairs being in the form of planar spiral turns arranged in a multi-ply arrangement, each receiver pair having two differentially connected receiver elements interconnected in phase opposition for the purpose of signal generation for each of at least two measuring channels, and wherein said at least one emitter element is excited with an AC voltage so as to emit a periodically alternating electromagnetic field which is inductively coupled to the receiver elements as a function of the relative position in the measuring direction relative to the measuring scale, whereby relative movement between the measuring scale and the coil structure inductively generates in the receiver coil pairs at least two phase-shifted signals, and means for generating from said phase-shifted receiver signals at least one output signal which is representative of said relative movement and which is compensated for offset and/or sinusoidal shape and/or amplitude.

2. The measuring device as claimed in claim 1, wherein the receiver coils have a different number of turns per unit length in accordance with the emitter field distribution in the measuring direction, in order to generate offset-compensated output signals.

3. The measuring device as claimed in claim 1 or 2, wherein, at least for a portion of their turns, the receiver coils have different lengths transverse to the measuring direction in accordance with the emitter field distribution in the measuring direction, in order to generate offset-compensated output signals.

4. The measuring device as claimed in claim 1, wherein the receiver coil structure is provided with at least one additional compensation receiver element which, owing to the interconnection with said receiver coils, leads to offset-compensated output signals through the compensation of the emitter field nonuniformity.

5. The measuring device as claimed in claim 1, wherein the emitter comprises a plurality of coils, and wherein at least one additional compensation emitter is provided which is arranged in the measuring direction or in a parallel plane relative to the emitter coils, and leads to a compensated, uniform exciter field distribution in the receiver plane.

6. The measuring device as claimed in claim 1, wherein the emitter comprises a plurality of coils which, arranged in the measuring direction, are constructed with at least one of different numbers of turns per unit length, distributions of turns, shapes of turns, width, length or supply currents, such that a uniform total exciter field is generated in the receiver plane by the superimposition of the effect of the individual fields in the measuring direction.

7. The measuring device as claimed in claim 1, wherein the emitter comprises a plurality of coils, and wherein at least one additional compensation emitter is provided which is arranged in the measuring direction in a parallel plane relative to the emitter coils and can be supplied independently of the emitter coils, in order to achieve a uniform total exciter field distribution in the receiver planes and/or to generate offset-free signals in the receiver coils.

8. The measuring device as claimed in claim 1, wherein the emitter width is $n\lambda \pm k$ for the purpose of suppressing the harmonics of the output signal, where n is a natural number, $\lambda$ is the graduation period and k is a correction value.

9. The measuring device as claimed in claim 1, wherein, in order to suppress the harmonics in the output signal, the distribution of the turns of the at least one emitter is not periodically uniform in the emitter plane.

10. The measuring device as claimed in claim 1, wherein, in order to suppress the harmonics in the output signal, the receiver elements have a width of $\lambda/2 \pm k$, where $\lambda$ is the graduation period and k a correction value.

11. The measuring device as claimed in claim 1, wherein, in order to suppress the harmonics in the output signal, within a receiver differential pair the receiver elements have a mutual spacing in the measuring direction of $\lambda/2 \pm k$, where $\lambda$ is the graduation period and k a correction value.

12. The measuring device as claimed in claim 1, wherein, in order to suppress the harmonics of the output signal, within a measuring channel the receiver differential pairs have a mutual spacing in the measuring direction of $n\lambda \pm ki$ ($i \in \{o,n\}$), where n is a natural number, $\lambda$ is the graduation period, k is a correction value and i is zero or a natural number.

13. The measuring device as claimed in claim 1, wherein, in order to suppress the harmonics of the output signal, the ratio of the subregions within a graduation period in the material measure is $(\lambda/2-k)/(\lambda/2+k)$ between the region of low reluctance and the region of high reluctance, where $\lambda$ is the graduation period and k a correction value.

14. The measuring device as claimed in claim 1, wherein, in order to suppress the harmonics of the output signal, the angle $\beta$ between the limits of the measuring scale and the measuring direction is not equal to 90°.

15. The measuring device as claimed in claim 1 wherein there is arranged in the receiver coils at least one spacing compensation coil which supplies a signal which is a strong function of spacing and with the aid of which the measuring signal amplitudes can be corrected in the electronic evaluation system.

16. The measuring device as claimed in claim 1, wherein large-area metal layers coupled to a fixed electrical potential are provided between and/or outside the coil structure planes for the purpose of shielding and/or capacitive decoupling.

17. The measuring device as claimed in claim 1, wherein the measuring scale has a cylindrical shape which has the at least one periodic graduation inside or outside, and wherein the coil structure is arranged in a form appropriate thereto.

18. The measuring device as claimed in claim 1, wherein the measuring scale is arranged on the face of a cylindrical component, and wherein the coil structure is arranged in a face concentric with said cylindrical face.

* * * * *

UNITED STATES PATENT AND TRADEMARK OFFICE
CERTIFICATE OF CORRECTION

PATENT NO. : 6,611,138 B2
DATED : August 26, 2003
INVENTOR(S) : Victor Vasiloiu

It is certified that error appears in the above-identified patent and that said Letters Patent is hereby corrected as shown below:

<u>Title page,</u>
Item [56], References Cited, OTHER PUBLICATIONS, "EP0 557 608." should read -- EP 0 557 608. --

<u>Drawings,</u>
Figure 29, "MATERIAL MEASURE" should read -- MEASURING SCALE --

<u>Column 2,</u>
Lines 26 and 30, "calliper" should read -- caliper --

<u>Column 8,</u>
Line 32, "Bs+=Bs–" should read -- Bs+≠Bs– --; and
"ΔOs=0." should read -- ΔOs≠0. --

<u>Column 9,</u>
Line 7, "(K11<<K10)" should read -- ($K_{11}$<<$K_{10}$) --

<u>Column 10,</u>
Lines 7 and 11, "consinusoidal" should read -- cosinusoidal --

Signed and Sealed this

Twenty-seventh Day of January, 2004

JON W. DUDAS
*Acting Director of the United States Patent and Trademark Office*